United States Patent
Nishibayashi et al.

(10) Patent No.: US 7,848,330 B2
(45) Date of Patent: *Dec. 7, 2010

(54) COMMUNICATION APPARATUS AND METHOD

(75) Inventors: Yasuyuki Nishibayashi, Kawasaki (JP); Masahiro Takagi, Tokyo (JP); Tomoko Adachi, Urayasu (JP); Tomoya Tandai, Tokyo (JP); Tetsu Nakajima, Yokohama (JP); Yoriko Utsunomiya, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/558,085

(22) Filed: Sep. 11, 2009

(65) Prior Publication Data

US 2010/0002646 A1  Jan. 7, 2010

Related U.S. Application Data

(62) Division of application No. 11/201,198, filed on Aug. 11, 2005.

(30) Foreign Application Priority Data

Oct. 19, 2004  (JP) .............................. 2004-304475

(51) Int. Cl.
*H04L 12/28* (2006.01)

(52) U.S. Cl. ....................... 370/392; 370/469

(58) Field of Classification Search ................ 370/329, 370/392, 469
See application file for complete search history.

(56) References Cited

U.S. PATENT DOCUMENTS

| 5,329,531 | A | 7/1994 | Diepstraten et al. |
| 5,754,947 | A | 5/1998 | Tanabe et al. |
| 6,934,752 | B1 | 8/2005 | Gubbi |
| 7,161,978 | B2 | 1/2007 | Lu et al. |
| 7,225,278 | B1 | 5/2007 | Baxter et al. |
| 7,496,076 | B2 | 2/2009 | Takagi et al. |
| 2003/0076826 | A1 | 4/2003 | Blasiak et al. |
| 2003/0081664 | A1* | 5/2003 | Lu et al. ...................... 375/222 |
| 2004/0057387 | A1 | 3/2004 | Yi et al. |
| 2005/0094632 | A1* | 5/2005 | Hebsgaard et al. .......... 370/389 |
| 2005/0135284 | A1 | 6/2005 | Nanda et al. |
| 2006/0034174 | A1 | 2/2006 | Nishibayashi et al. |
| 2006/0034219 | A1* | 2/2006 | Gu et al. ..................... 370/329 |

(Continued)

FOREIGN PATENT DOCUMENTS

JP  9-205431  8/1997

(Continued)

*Primary Examiner*—Seema S Rao
*Assistant Examiner*—Sai-Ming Chan
(74) *Attorney, Agent, or Firm*—Oblon, Spivak, McClelland, Maier & Neustadt, L.L.P.

(57) ABSTRACT

A communication apparatus includes a receiving device configured to receive a physical frame in which a plurality of MAC frames, each having a sequence number, are aggregated. A reception buffer which stores MAC frames of the physical frame received by the receiving device. A determination device determines whether or not the first MAC frame in the physical frame received by the receiving device has been successfully received. A reception buffer management device determines, when the first MAC frame has been successfully received, a MAC frame to be forwarded to an upper layer, on the basis of the sequence number of the first MAC frame, and extracts the MAC frame from the reception buffer.

7 Claims, 25 Drawing Sheets

U.S. PATENT DOCUMENTS

| | | |
|---|---|---|
| 2006/0092871 A1 | 5/2006 | Nishibayashi et al. |
| 2008/0150675 A1 | 6/2008 | Hirano et al. |
| 2008/0165713 A1 | 7/2008 | Nishibayashi et al. |
| 2008/0181251 A1 | 7/2008 | Nishibayashi et al. |

FOREIGN PATENT DOCUMENTS

| | | |
|---|---|---|
| JP | 2002-314546 | 10/2002 |
| JP | 2004-260658 | 9/2004 |

* cited by examiner

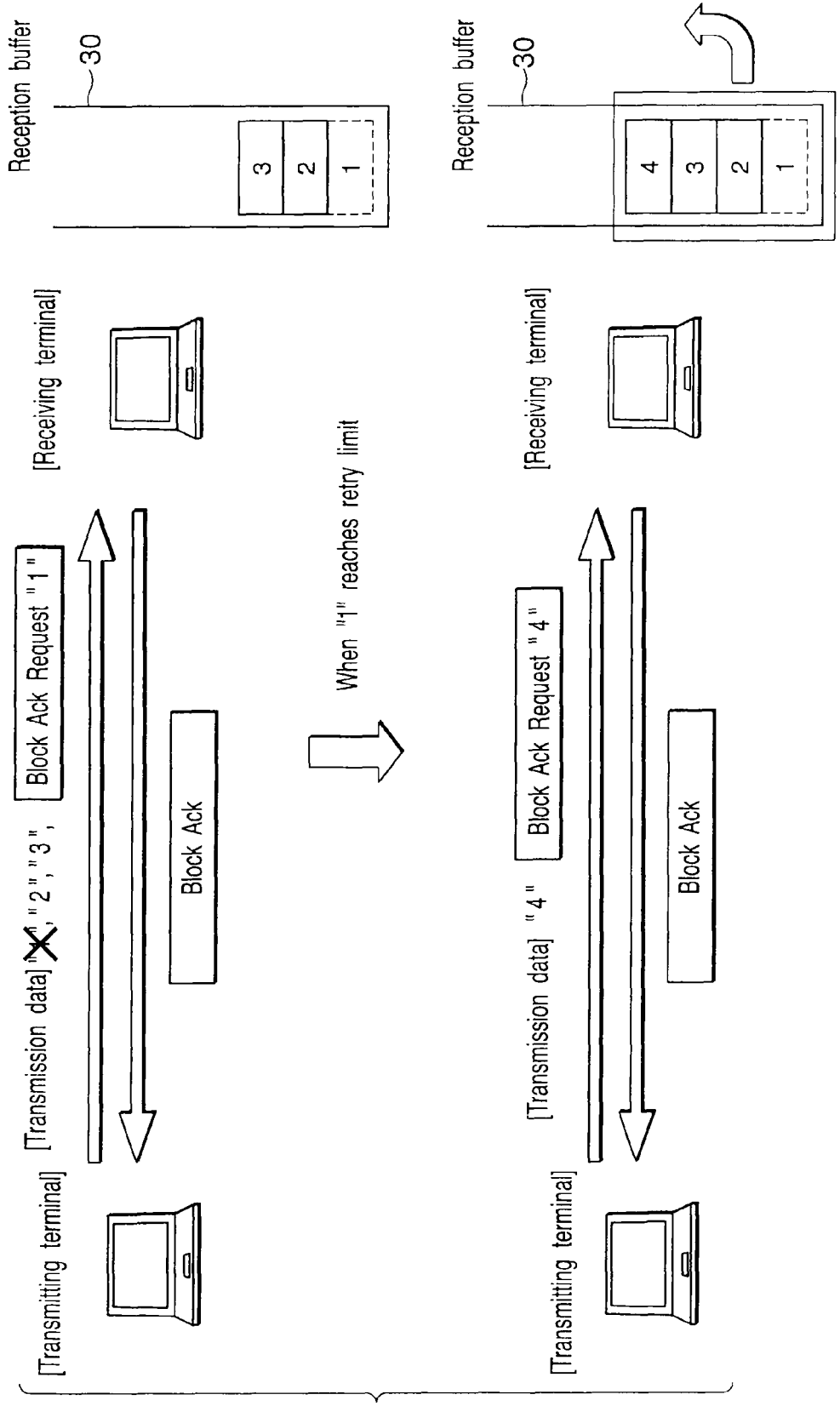
F I G. 3

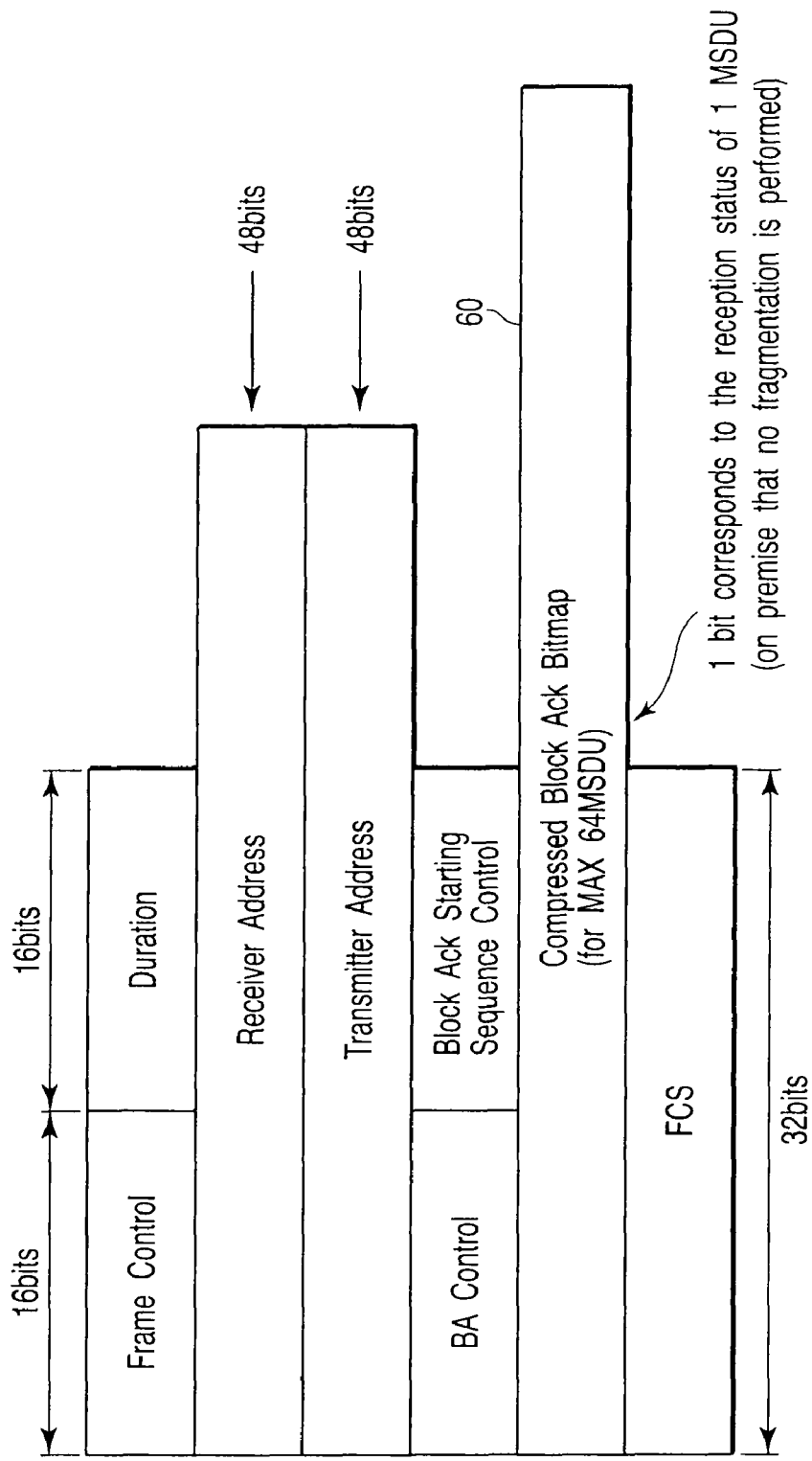
F I G. 6

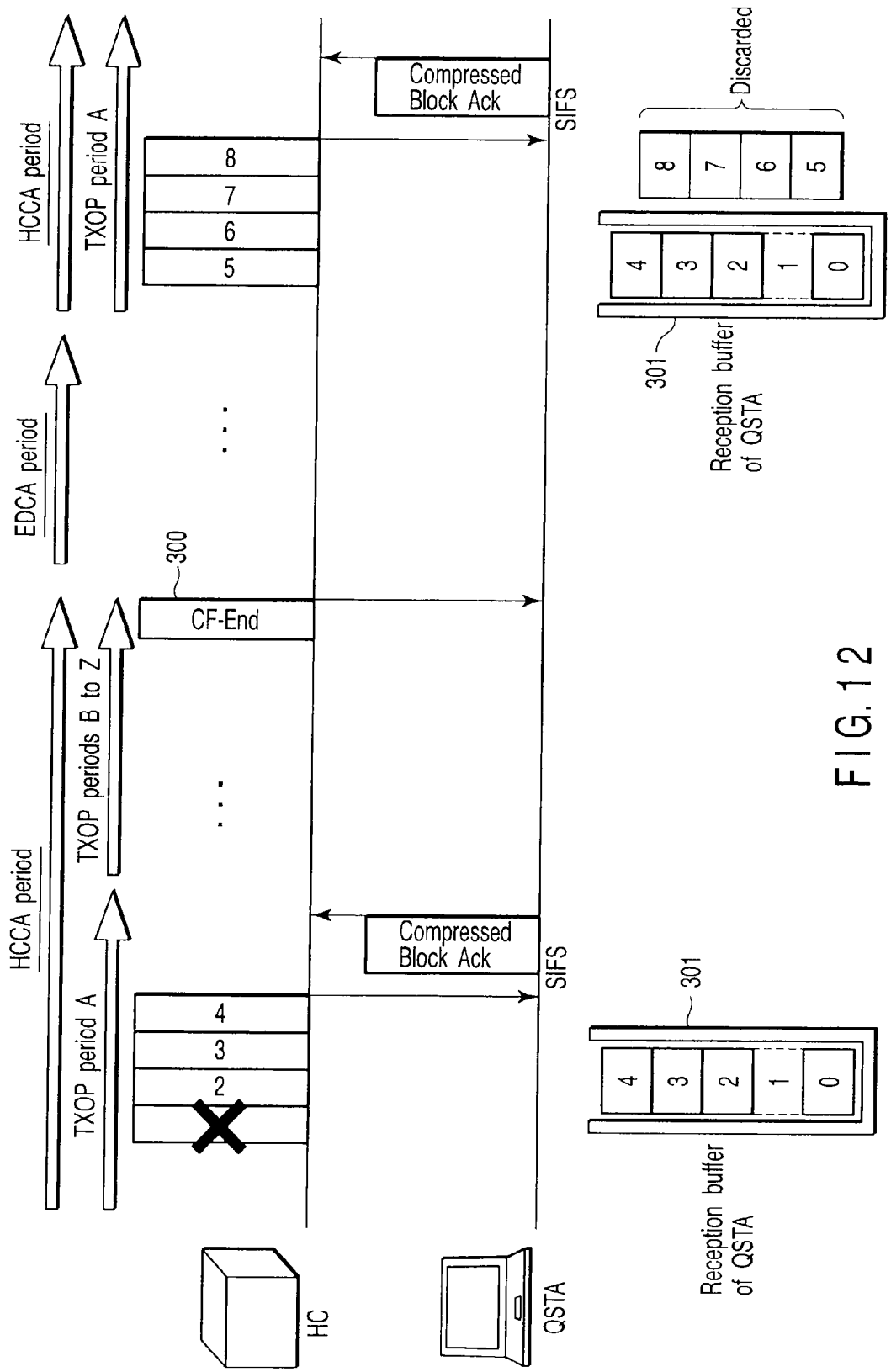
F I G. 12

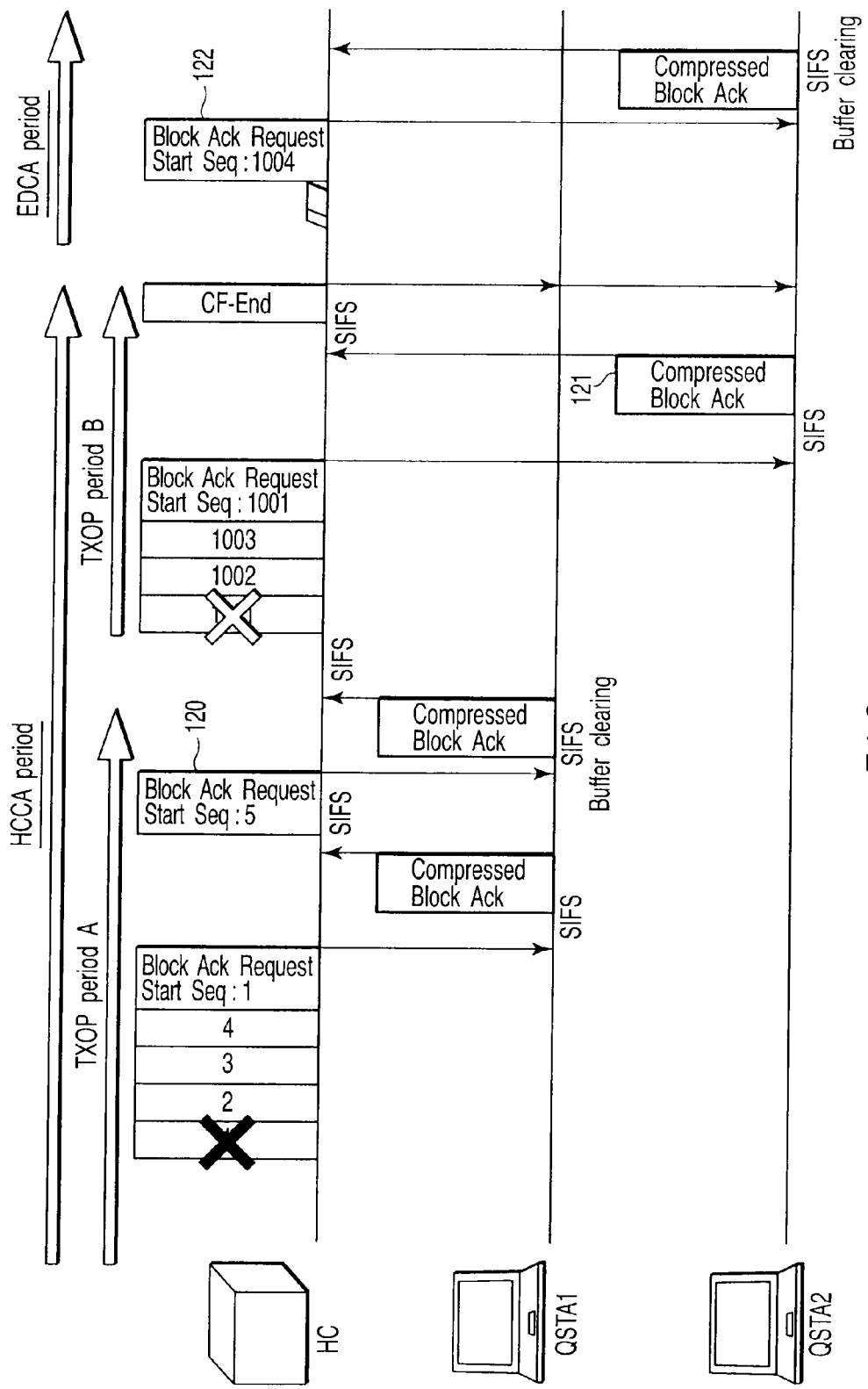
F I G. 14

COMMUNICATION APPARATUS AND METHOD

CROSS-REFERENCE TO RELATED APPLICATIONS

This application is a divisional of U.S. application Ser. No. 11/201,198 filed Aug. 11, 2005, and is based upon and claims the benefit of priority from prior Japanese Patent Application No. 2004-304475, filed Oct. 19, 2004, the entire contents of each of which are incorporated herein by reference.

BACKGROUND OF THE INVENTION

1. Field of the Invention

The present invention relates to a communication apparatus and method which perform Media Access Control on the basis of the carrier sense information of a physical layer and the carrier sense information of a MAC layer.

2. Description of the Related Art

The Media Access Control (MAC) is control for causing a plurality of communication apparatuses which perform communication while sharing the same wireless media to decide how to use the wireless media in transmitting communication data or management frame. Owing to Media Access Control, even if two or more communication apparatuses transmit communication data or management frame by using the same wireless media at the same time, there is less chance of the occurrence of a phenomenon (collision) in which a communication apparatus on the receiving side cannot decode communication data properly. Media Access Control is also a technique for controlling access from communication apparatuses to a media so as to minimize the chance of the occurrence of a phenomenon in which, despite the presence of communication apparatuses having transmission requests, the media is not used by any of the communication apparatuses.

However, especially in wireless communication, it is difficult to simultaneously monitor transmission data (or management) frame while the communication apparatus transmits the frame, and therefore the Media Access Control (MAC) is required in which collision detection is not assumed. A typical technique standard of wireless LAN IEEE802.11 adopts CSMA/CA (Carrier Sense Multiple Access with Collision Avoidance). The CSMA/CA is designed to reduce the collision probability. In IEEE802.11, the MAC header has the Duration value which is the time, in microseconds, required to transmit the data or management frame (including the time of SIFS interval). In this period, a communication apparatus which is irrelevant to the frame exchange sequence and has no transmission right waits for transmission upon determining a virtual busy state of the media. This prevents the occurrence of collision. IEEE 802.11 defines that the state of a wireless media is determined on the basis of such a combination of virtual carrier-sense on a MAC layer and physical carrier sense on a physical (PHY) layer, and Media Access Control is performed on the basis of the determination.

IEEE 802.11 using CSMA/CA has increased the communication speed mainly by changing the physical layer protocol. With regard to the 2.4 GHz band, there have been changes from IEEE 802.11 (established in 1997, 2 Mbps) to IEEE 802.11b (established in 1999, 11 Mbps), and further to IEEE 802.11g (established in 2003, 54 Mbps). With regard to the 5 GHZ band, only IEEE 802.11a (established in 1999, 54 Mbps) exists as a standard. In order to develop standard specifications directed to further increase communication speeds in both the 2.4 GHz band and the 5 GHz band, IEEE 802.11 TGn (Task Group n) has already been established.

In addition, several access control techniques designed to improve QoS (Quality of Service) are known. For example, as a QoS technique of guaranteeing parameters such as a designated bandwidth and delay time, HCCA (HCF Controlled Channel Access) which is an extended scheme of a conventional polling sequence is available. According to HCCA, scheduling is performed in a polling sequence in consideration of required quality so as to guarantee parameters such as a bandwidth and delay time. Jpn. Pat. Appln. KOKAI Publication No. 2002-314546 refers to QoS in the IEEE 802.11e standard, and discloses a method of assigning priorities to communications between communication apparatuses in a wireless network.

When the same frequency band as that in the existing specifications is to be used in realizing an increase in communication speed, it is preferable to assure coexistence with communication apparatuses conforming to the existing specifications and to maintain backward compatibility. For this reason, it is basically preferable that a protocol on a MAC layer conforms to CSMA/CA matching the existing specifications. In this case, a temporal parameter associated with CSMA/CA, e.g., an IFS (InterFrame Space) or random backoff period needs to match that in the existing specifications.

Even if an attempt to increase the communication speed in terms of physical layer succeeds, the effective throughput of communication cannot be improved. That is, when an increase in the communication speed of the physical layer is realized, the format of a PHY frame (PHY preamble and PHY header) ceases to be effective any more. An increase in overhead due to this may hinder an increase in throughput. In a PHY frame, a temporal parameter associated with CSMA/CA is permanently attached to a MAC frame. In addition, a PHY frame header is required for each MAC frame.

As a method of reducing overhead and increasing throughput, a Block Ack technique introduced in recently drafted IEEE 802.11e/draft 5.0 (enhancement of QoS in IEEE 802.11) is available. The Block Ack technique can consecutively transmit a plurality of MAC frames without any random backoff, and hence can reduce the backoff amount to some degree. However, a physical layer header cannot be effectively reduced. In addition, according to aggregation introduced in initially drafted IEEE 802.11e, both the backoff amount and the physical layer header can be reduced. However, since the length of a physical layer frame containing MAC frames cannot be increased beyond about 4 kbytes under the conventional limitation on the physical layer, an improvement in efficiency is greatly limited. Even if the length of a PHY layer frame can be increased, another problem arises, i.e., a reduction in error tolerance.

BRIEF SUMMARY OF THE INVENTION

The present invention is directed to a communication apparatus and method which can coexist with an existing apparatus and can improve the substantial communication throughput by eliminating overhead accompanying the transmission of a plurality of frames by making a frame format more efficient.

According to an aspect of the present invention, there is provided a communication apparatus comprising a receiving device configured to receive a physical frame in which a plurality of MAC frames, each having a sequence number, are aggregated, a reception buffer which stores MAC frames of the physical frame received by the receiving device, a determination device configured to determine whether or not a first MAC frame in the physical frame received by the receiving device has been successfully received, and a reception buffer management device configured to, when the first MAC frame has been successfully received, determine a MAC frame to be forwarded to an upper layer, on the basis of a sequence number of the first MAC frame, and extract the MAC frame from the reception buffer so as to forward the MAC frame to the upper layer.

BRIEF DESCRIPTION OF THE SEVERAL VIEWS OF THE DRAWING

FIG. 3 is a view for explaining buffer management to be performed on the receiving side when data transmission is performed by using the Block Ack defined in IEEE 802.11e;

FIG. 6 is a view showing the format of a Compressed Block Ack;

FIG. 12 is a view for explaining an example of how the reception buffer is cleared according to the second embodiment of the present invention;

FIG. 14 is a view for explaining another example of how the reception buffer is cleared according to the second embodiment of the present invention;

DETAILED DESCRIPTION OF THE INVENTION

Figure 1:
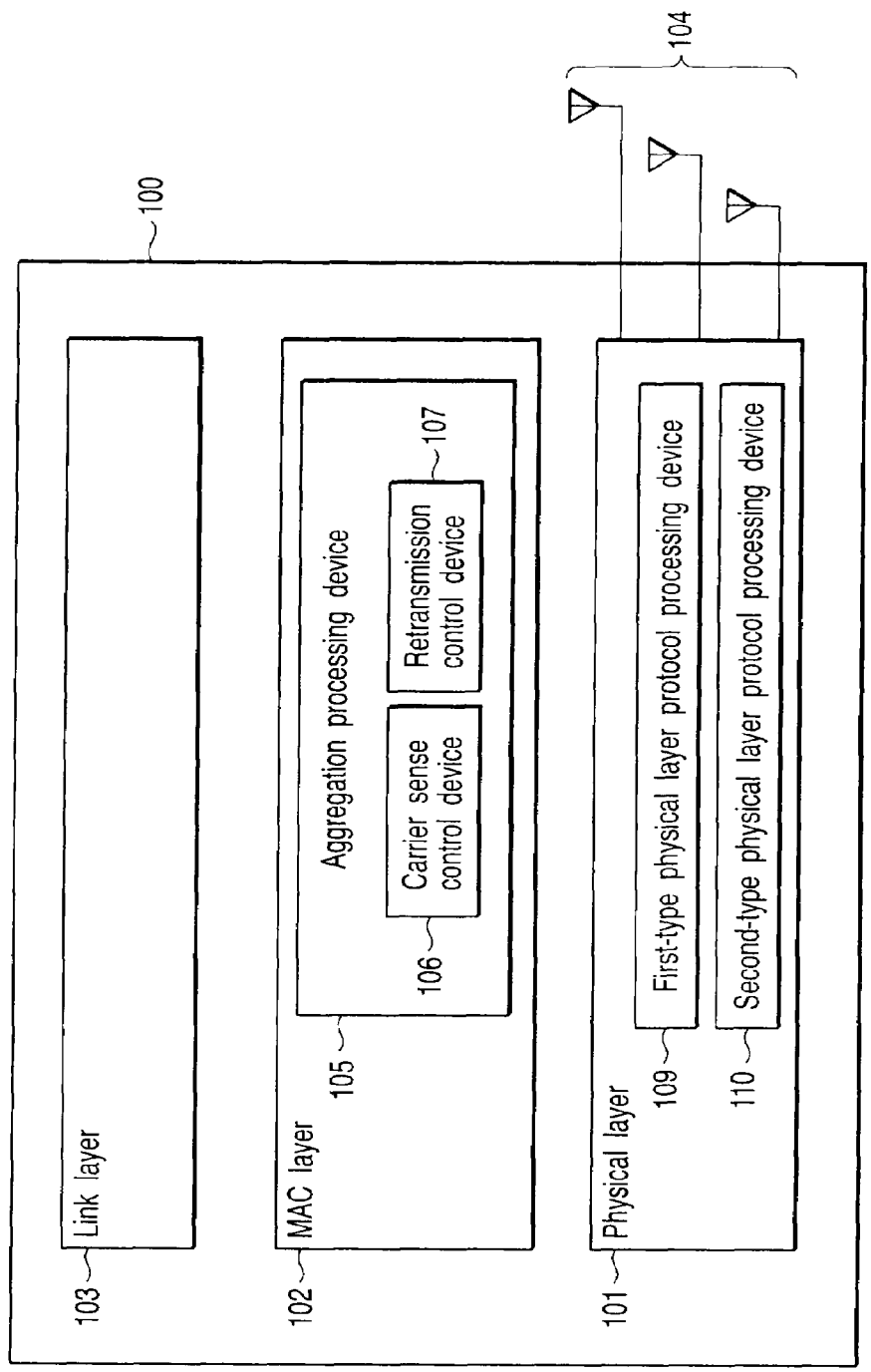
FIG. 1 is a block diagram showing the arrangement of a communication apparatus according to an embodiment of the present invention.

FIG. 1 is a block diagram showing the arrangement of a communication apparatus according to the first embodiment of the present invention. A communication apparatus 100 is an apparatus configured to communicate with another communication apparatus through a wireless link, and includes processing units 101, 102, and 103 respectively corresponding to a physical (PHY) layer, MAC layer, and link layer. These processing units are implemented as analog or digital electronic circuits in accordance with implementation requirements. Alternatively, the processing units are implemented as firmware or the like to be executed by a CPU incorporated in an LSI. An antenna 104 is connected to the PHY layer processing unit ("processing unit" will be omitted hereinafter) 101. The MAC layer 102 includes an aggregation processing device 105 for MAC frames. The aggregation processing device 105 includes a carrier sense control device 106 and retransmission control device 107, and performs transmission/reception of Block Ack (partial acknowledgement frame for a plurality of MAC frames) frames (to be described in detail later), retransmission control based on Block Ack frames, and the like.

The physical layer 101 is designed to be compatible with two types of physical layer protocols. The processing unit 101 includes a first-type physical layer protocol processing device 109 and a second-type physical layer protocol processing device 110 for the respective types of protocol processing. The first-type physical layer protocol processing device 109 and second-type physical layer protocol processing device 110 often share circuits and are not necessarily independent of each other in terms of implementation.

In this embodiment of the present invention, the first-type physical layer protocol is assumed to be a protocol defined in IEEE 802.11a, and the second-type physical layer protocol is assumed to be a protocol using a so-called MIMO (Multiple Input Multiple Output) technique using a plurality antennas on each of the transmitting side and the receiving side. Using the MIMO technique makes it possible to expect an increase in transmission capacity almost proportional to the number of antennas without changing the frequency band. The MIMO technique is therefore a technique directed to further increase the throughput of IEEE 802.11. Note that the link layer 103 has a normal link layer function defined in IEEE 802.11. The technique to be used to increase the transmission rate is not limited to MIMO. For example, a method of increasing the occupied frequency band may be used or may be combined with MIMO.

Figure 25:
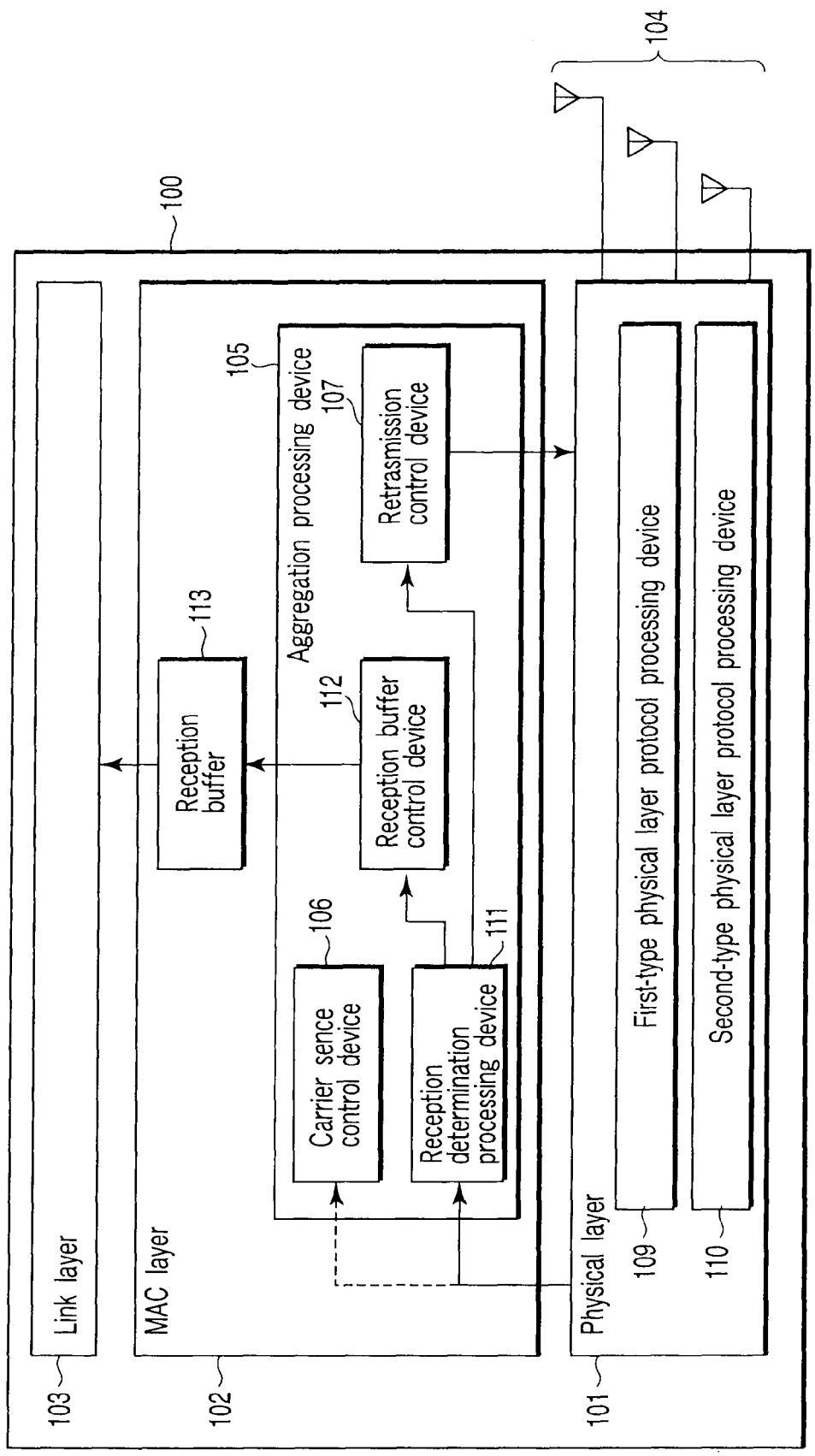
FIG. 25 is a block diagram showing the detailed arrangement of a communication apparatus according to an embodiment of the present invention.

FIG. 25 is a block diagram showing the detailed arrangement of a communication apparatus according to the first embodiment of the present invention. The MAC layer 102 includes an aggregation processing device 105 for MAC frames and a reception buffer 113. The aggregation processing device 105 includes a carrier sense control device 106, retransmission control device 107, reception determination processing device 111, and reception buffer control device 112. The reception buffer 113 includes a buffer region wherein MAC frames that are normally received are stored. The carrier sense control device 106 recognizes that the wireless medium is in a busy state, while the physical frame in which multiple MAC frames are aggregated, is received through the physical layer 101. On the contrary, the carrier sense control device 106 recognizes that the wireless medium is in an idle state, if the wireless medium is available (not used). To be described later, all of the aggregated MAC frames are checked by the reception determination processing device 111 whether each of them has been successfully received or not. The retransmission control device 107 notifies the reception status of each of the MAC frames, to the transmitting side by transmitting a Block Ack frame, which includes a multiple acknowledgements for the multiple MAC frames. The retransmission control device 107 performs retransmission control based on Block Ack Request (request for partial acknowledgement) frames and Block Ack frames responding to them. The MAC frame which has been successfully received is stored in the reception buffer 113. The determination whether the MAC frame has been successfully received or not is based on a result of a (CRC) check performed by the reception determination processing device 111. In the case of a Block Ack Request frame, information thereof is notified to the retransmission control device 107.

In the first embodiment of the present invention, MAC frames are extracted from the reception buffer 113 based on the determination result of the reception determination processing device 111, and forwarded to the upper layer (link layer 103).

According to IEEE 802.11e/Draft 8.0, as a technique of improving the transmission efficiency at the MAC (Media Access Control) layer, a Block Ack technique has been proposed. In the Block Ack technique, a given terminal transmits QoS (Quality of Service) data at minimum frame intervals called SIFS (Short InterFrame Space) for a given channel use period (TXOP: Transmission Opportunity). Thereafter, the terminal transmits a Block Ack Request frame to the receiving terminal at an arbitrary timing to request its reception status. The receiving side converts the reception status into information in the bitmap format on the basis of the starting sequence number (Block Ack Starting Sequence Control) determined by the Block Ack Request, and returns the information as a Block Ack.

Prior to the detailed description of the embodiments of the present invention, existing techniques for Block Acks and buffer management on a data receiving terminal for Block acknowledgement will be described. According to IEEE 802.11e/Draft 10.0, as a technique of improving the transmission efficiency at the MAC (Media Access Control) layer, a Block acknowledgement technique is known. In the Block acknowledgement technique, a given transmitting terminal transmits QoS (Quality of Service) data at minimum frame intervals called SIFS (Short InterFrame Space) for a given channel use period (TXOP: Transmission Opportunity). Thereafter, the transmitting terminal transmits a Block Ack Request to the receiving terminal to request its reception status (partial acknowledgement) at an arbitrary timing. The receiving side converts the reception status into information in the bitmap format on the basis of the starting sequence number (Block Ack Starting Sequence Control) determined by the Block Ack Request, and returns the information as a Block Ack.

Figure 2:
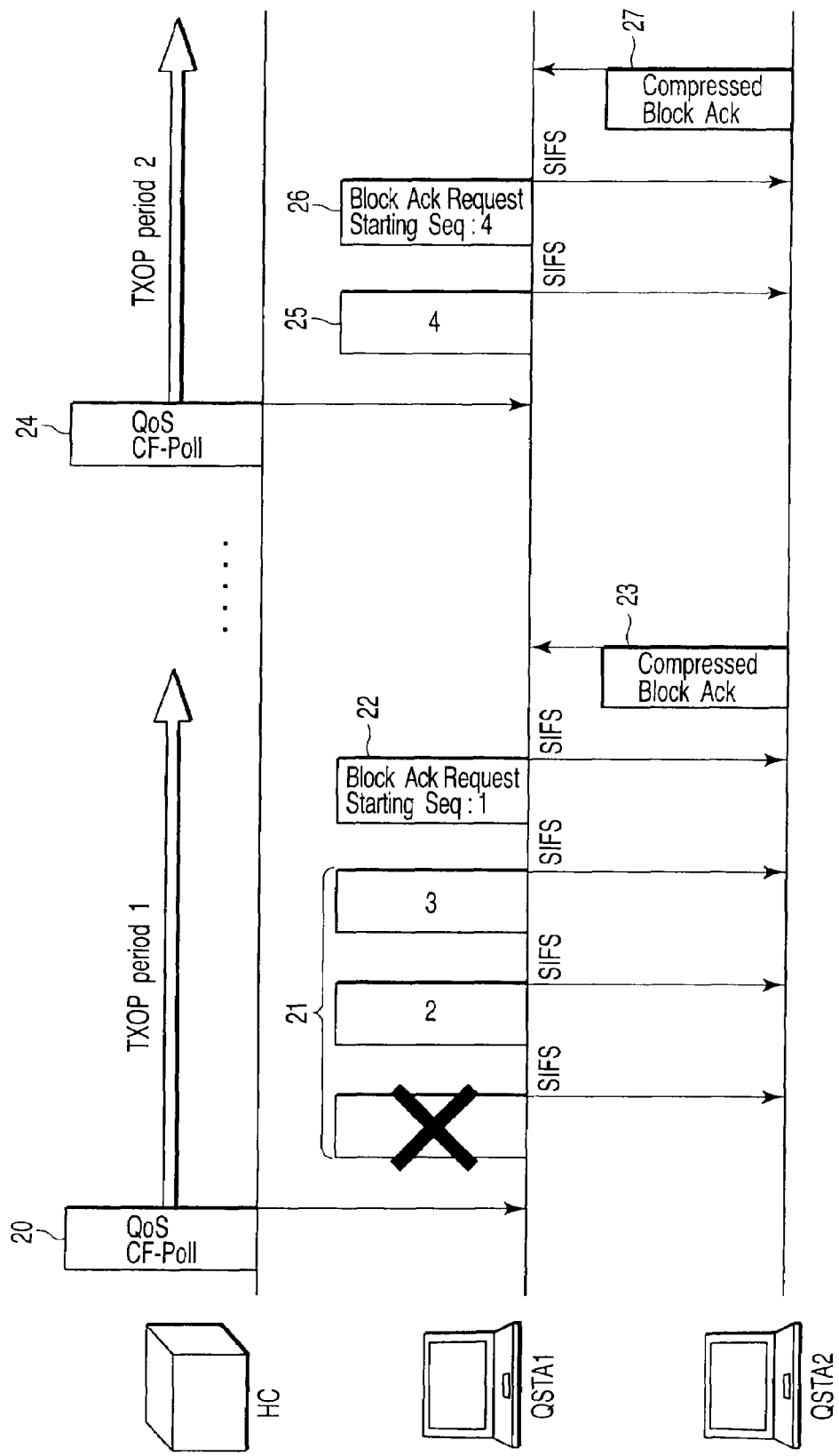
FIG. 2 is a view showing an example of an immediate Block Ack sequence in HCCA (Hybrid coordination function Controlled Channel Access)

FIG. 2 shows an example of an immediate Block Ack sequence in HCCA (Hybrid coordinate function Controlled Channel Access). HCCA is a contention-free QoS control scheme, in which a QOS-AP (QoS Access Point; it can be called "QAP") called an HC (Hybrid Coordinator) serves as an entity which performs bandwidth management including the allocation of TXOPs to QSTAs (QoS stations). The HC shown in FIG. 2 transmits a QoS CF-Poll (Contention Free Poll) frame 20 to a QSTA (QoS Station) 1 and gives it a permission to use a channel as TXOP period 1. The QSTA 1 transmits QoS data 21 for TXOP period 1 at SIFS intervals in a burst manner, and then transmits a Block Ack Request 22. The Block Ack Request 22 includes a 2-octet field called Block Ack Starting Sequence Control, in which a fragment number and starting sequence number (Starting Seq in the FIG. 2) are written. A QSTA 2 on the data receiving side generates a Block Ack 23 by converting a reception status starting with the fragment number and starting sequence number into information in the bitmap format (Block Ack Bitmap), and notifies the QSTA 1 on the data transmitting side of the Block Ack 23.

More specifically, as shown in FIG. 2, the QSTA 1 transmits first the QoS data 21 with sequence numbers "1", "2", and "3" to the QSTA 2 at SIFS intervals in a burst manner, and then transmits the Block Ack Request 22 upon setting the Block Ack Starting Sequence Control value to "1". The QSTA 2 receives the Block Ack Request 22. Since the Block Ack Starting Sequence Control value of the Block Ack Request 22 is "1", the QSTA 2 writes a relative reception status from sequence number "1" in a Block Ack Bitmap, and transmits the Block Ack 23 to the QSTA 1.

In the example shown in FIG. 2, the result of FCS (Frame Check Sequence) calculation indicates that an error has occurred in the data with sequence number "1". Although the Block Ack Starting Sequence Control value of the Block Ack 23 is "1", the Block Ack Bitmap indicates that only the data with sequence numbers "2" and "3" have been successfully received, by using the bits in the corresponding positions. In general, the Block acknowledgement technique can notify a reception status corresponding to a maximum of 64 MSDUs (MAC Service Data Units), including a case of fragmentation. The MSDU is information that is delivered as a unit between MAC-SAPS (service access points). The MPDU is the unit of data exchanged between two peer MAC entities using the services of the PHY layer. According to the IEEE 802.11 standard, one MSDU is fragmented into a maximum of 16 MPDUs (MAC Protocol Data Units). Therefore, a Block Ack Bitmap field contained in a Block Ack frame has a size of 1,024 (64 MSDUs×16) bits. According to the IEEE 802.11 standard, a Retry Limit and Lifetime are set for a data frame to be transmitted. Any frame that exceeds the Retry Limit or Lifetime is discarded on the transmitting side. According to the IEEE 802.11e standard, a Delay Bound is associated with each frame in accordance with traffic characteristics. The Delay Bound contains an unsigned integer that specifies the maximum amount of time, in microseconds, allowed to transport an MSDU belonging to the TS (Traffic Stream) in this TSPEC (Traffic Specification), measured between the time marking the arrival of the MSDU at the local MAC sublayer from the local MAC-SAP and the time of completion of the successful transmission or retransmission of the MSDU to the destination. For example, for traffic required to meet a real-time transmission like voice data, a relatively short Delay Bound is set. When the Delay Bound is exceeded, the corresponding frame is also discarded on the transmitting side. In the example shown in FIG. 2, the QoS data frame with sequence number "1" needs to be retransmitted, but the transmitting side has abandoned to retransmit it because the Retry Limit or the like is exceeded.

When the HC assigns the QSTA 1 a TXOP period 2 again to permit the QSTA 1 to use the channel by transmitting a QoS CF-Poll frame 24 to the QSTA 1 after a lapse of a predetermined amount of time since the expiration of the TXOP period 1, the QSTA 1, which has aborted retransmission of the frame with sequence number "1", is now transmitting data 25 with sequence number "4". The QSTA 1 then transmits a Block Ack Request 26 upon setting the Block Ack Starting Sequence Control value to "4". The QSTA 2 returns a Block Ack 27 indicating that "4" has been successfully received. Note that in the example shown in FIG. 2, all the frames have the same priority. According to the IEEE 802.11e standard, data frames to be transmitted are classified according to the traffic types, and are assigned identifiers called TIDs (Traffic Identifiers). Since a sequence number is also assigned for each TID, a Block Ack Request or Block Ack is required for each TID.

FIG. 3 shows how buffer management is performed on the receiving side on the basis of the contents shown in FIG. 2 when data transmission is performed by the Block Ack technique defined in IEEE 802.11e. Assume that a buffer 30 on the receiving side is empty. Assume that the transmitting terminal transmits data with sequence numbers "1", "2", and "3" in a burst manner, and only the data with sequence numbers "2" and "3" have been successfully received, as shown in FIG. 3. On the receiving side, since the frame with sequence number "1" has not been received, the frames with sequence numbers "2" and "3" are kept stored in the reception buffer 30 at the MAC layer.

In this case, when the frame with sequence number "1" reaches the Retry Limit (or Lifetime, Delay Bound), the transmitting terminal newly transmits a frame with sequence number "4", and then transmits a Block Ack Request with the Block Ack Starting Sequence Control value being set to "4". At this time, the frames with sequence numbers "2", "3", and "4" are stored in the buffer 30 on the receiving side. Note that when the Block Ack Request is received, the Block Ack Starting Sequence Control value is set to "4". According to the IEEE 802.11e/Draft 10.0 standard, all complete MSDUs with lower sequence numbers than the starting sequence number contained in the Block Ack Request shall be indicated to the MAC client. Therefore, all the data frames with lower sequence numbers than the Block Ack Starting Sequence Control value "4", i.e., sequence numbers "2" and "3", are released from the buffer 30 and forwarded to the upper layer. In addition, the frame with sequence number "4" consecutive to sequence numbers "2" and "3" is released from the buffer 30 and forwarded to the upper layer. The above buffer management on the receiving side is the same as that in EDCA (Enhanced Distributed Channel Access) which is a contention-based QoS control scheme.

First Embodiment

The first embodiment of the present invention is directed to a communication apparatus designed to aggregate a plurality of MPDUs (MAC Protocol Data Units) into a single PSDU (PHY Service Data Unit) and transmit a PPDU (PHY Protocol Data Unit) containing no Block Ack Request, in which when the first MPDU has been successfully received, reception buffer management is performed on the basis of the sequence number of the first MPDU. Note that a PPDU corresponds to a physical frame containing a PHY Preamble and a PHY Header and PSDU (including multiple MPDUs), and an MPDU corresponds to a MAC frame containing a MAC header and MSDU (MAC Service Data Unit).

Figure 4:
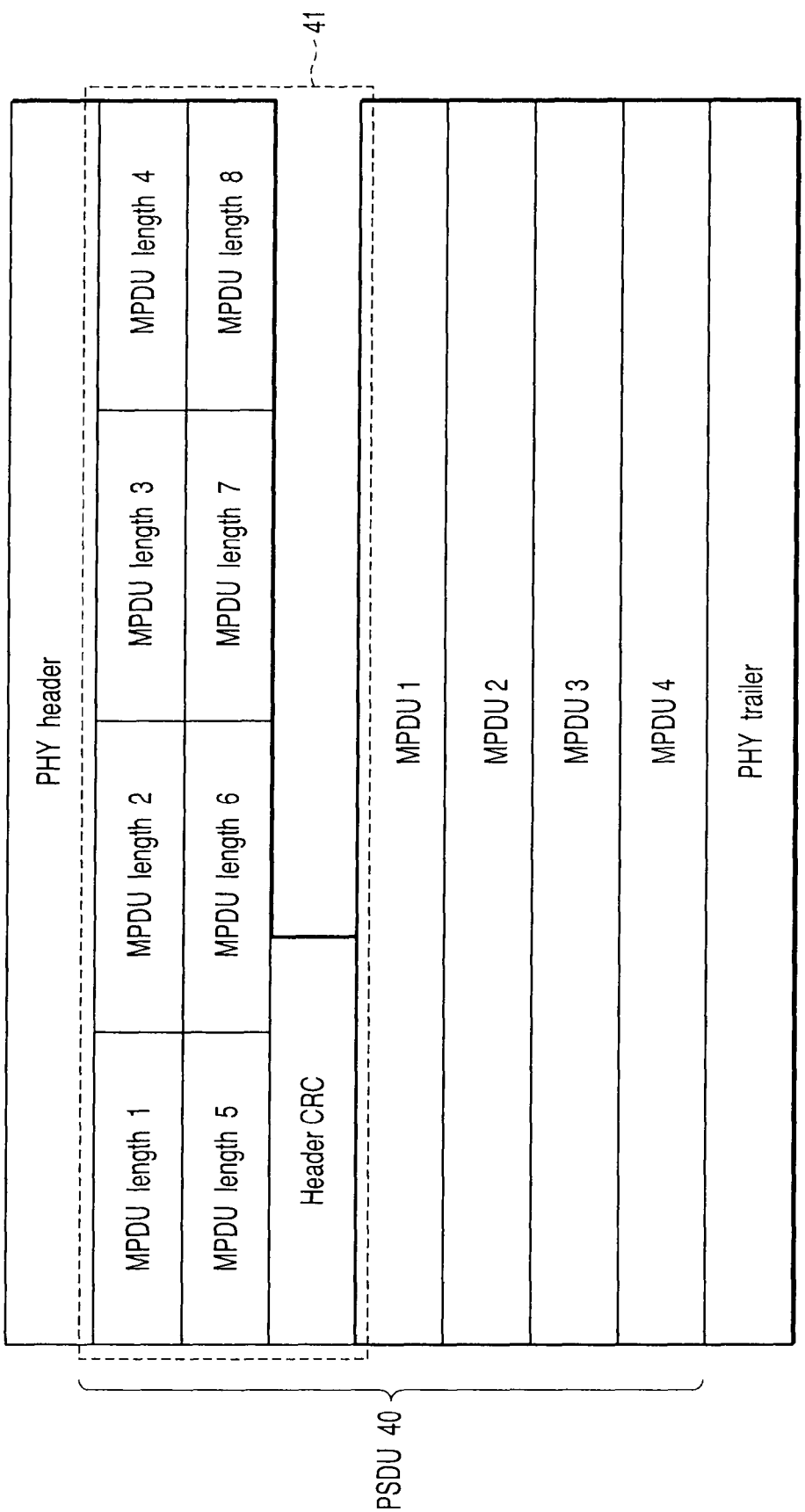
FIG. 4 is a view showing the format of a physical frame in which a plurality of MPDUs are aggregated into one PSDU.
Figure 5:
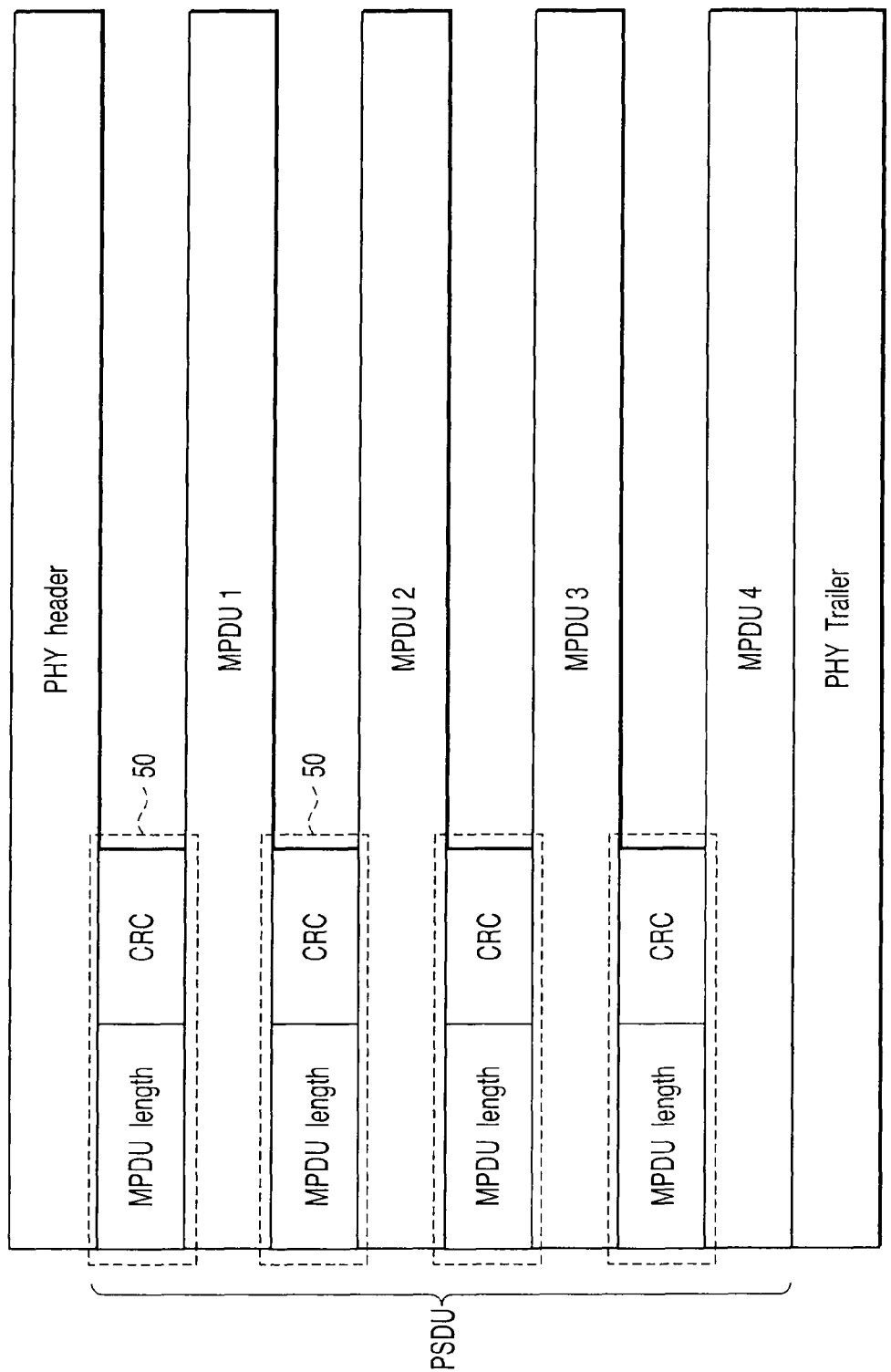
FIG. 5 is a view showing another example of the format of a physical frame in which a plurality of MPDUs are aggregated into one PSDU.

In order to achieve a high throughput in wireless LAN, the overhead of the MAC layer and the PHY layer, such as an interframe space, random backoff period and PHY header must be reduced. As shown in FIGS. 4 and 5, these overheads can be reduced by transmitting a plurality of MPDUs upon aggregating them into one PSDU. In the example shown in FIG. 4, a header 41 which indicates in octets the length of each MPDU containing a MAC header to an FCS exists in the head of a PSDU 40 in which a plurality of MPDUs are aggregated. The header 41 will be referred to as a MAC super frame header hereinafter. A CRC (Cyclic Redundancy Check) for detecting an error in the header 41 itself is added to the MAC super frame header 41. "0" is written in an MPDU length field corresponding to a portion in which no MPDU exists. In addition, if the MAC super frame header 41 is incorrect, the reception of all the MPDUs is considered to be wrong. In the example shown in FIG. 5, in the front portion of each of the aggregated MPDUs, information indicating the length of a corresponding MPDU exists. In addition, a CRC for detecting an error in the MPDU length information is added to it. A combination of MPDU information and a CRC will be referred to as an MPDU separation 50. Upon receiving a physical frame (PPDU) having the arrangement shown in FIG. 5, a terminal checks the CRC of the MPDU separation 50. If the first MPDU separation 50 has been successfully received, the terminal extracts succeeding MPDU1 and calculates an FCS. If the FCS calculation result is correct, it is determined that MPDU1 has been successfully received. If the FCS calculation result is incorrect, the reception of MPDU1 is considered to be wrong. The terminal then checks the CRC of a next MPDU separation 51 upon skipping a portion indicated by the MPDU length information. If the MPDU separation 51 is incorrect, the terminal consecutively performs a CRC check on an octet basis. If the result is correct, the FCS for the succeeding MPDU is calculated to determine whether or not the MPDU has been successfully received.

In the following description concerning the embodiment of the present invention, for a partial acknowledgement to a physical frame (PPDU) in which a plurality of MPDUs are aggregated in a PSDU, for example, an extended one of the Block Ack defined in IEEE 802.11e is used. FIG. 6 shows the frame arrangement of an extended Block Ack. According to IEEE 802.11e/Draft 10.0, a Block Ack frame has a bitmap (Block Ack Bitmap) having a fixed length of 1,024 bits in consideration of fragmentation. Since the overhead of a fragment is generally large, in order to achieve a high throughput, it is preferable not to fragment an MSDU. An extended Block Ack frame therefore includes a Block Ack Bitmap 60 corresponding at most to 64 MSDUs on the premise that no fragmentation is performed, as shown in FIG. 6. This makes it possible to reduce the bitmap size, that is the reception status bitmap, to 1/16 that of a conventional Block Ack frame. A Block Ack frame with a compressed Block Ack Bitmap will be referred to as a "Compressed Block Ack" hereinafter. Note that the Block Ack Bitmap of a Compressed Block Ack may have a variable length in accordance with the number of MPDUs aggregated into one PSDU.

Figure 7:
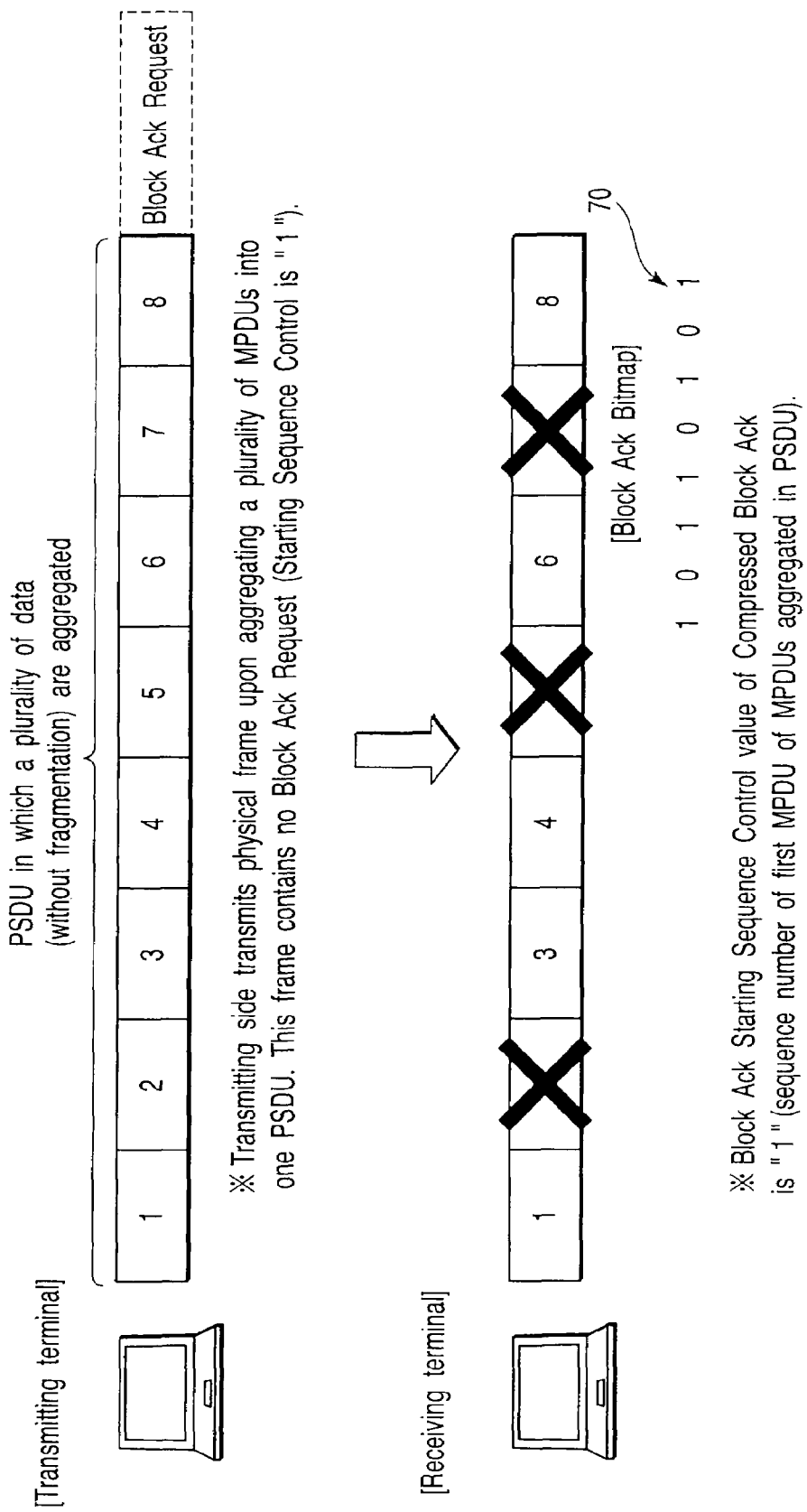
FIG. 7 is a view showing an example of the transmission of a physical frame which has a plurality of MPDUs aggregated into a single PSDU and contains no Block Ack Request.

A case wherein a physical frame in which a plurality of MPDUs are aggregated in a signal PSDU is to be transmitted will be described with reference to FIGS. 7 and 8. Consider a case wherein MPDUs with sequence numbers "1" to "8" are aggregated by a transmitting terminal, as shown in FIG. 7. According to the IEEE 802.11e/Draft 10.0 standard, a Block Ack Request is required to return a Block Ack. The first embodiment is, however, based on the premise that when a physical frame in which a plurality of MPDUs are aggregated is received, a Compressed Block Ack is immediately returned even if no Block Ack Request is contained in the frame. A Compressed Block Ack corresponds to an acknowledgement obtained by simply converting the reception status of each MPDU in the received PSDU into a Block Ack Bitmap. A Compressed Block Ack differs from the Block Ack defined in IEEE 802.11e in that there is no need to generate a Block Ack frame by searching a reception status cache on the basis of the Block Ack Starting Sequence Control value indicated by a Block Ack Request.

Assume that, as shown in FIG. 7, of the plurality of MPDUs aggregated into the PSDU of the physical frame received by the receiving terminal, the MPDUs with sequence numbers "2", "5", and "7" have been found to be incorrect as a result of FCS calculation. In this case, since the first MPDU has been successfully received, the value of the sequence number of the first MPDU can be simply set as the Block Ack Starting Sequence Control value of a Block Ack Request. The receiving terminal returns a Compressed Block Ack having a Compressed Block Ack Bitmap 70 written as 10110101 . . . with the Block Ack Starting Sequence Control value being set to "1". Upon receiving this Compressed Block Ack, the data transmitting terminal knows from the value of the Compressed Block Ack Bitmap 70 that the MPDUs with sequence numbers "1", "3", "4", "6", and "8" have been successfully transmitted, and determines that the MPDUs with other sequence numbers, i.e., "2", "5", and "7", need to be retransmitted.

Figure 8:
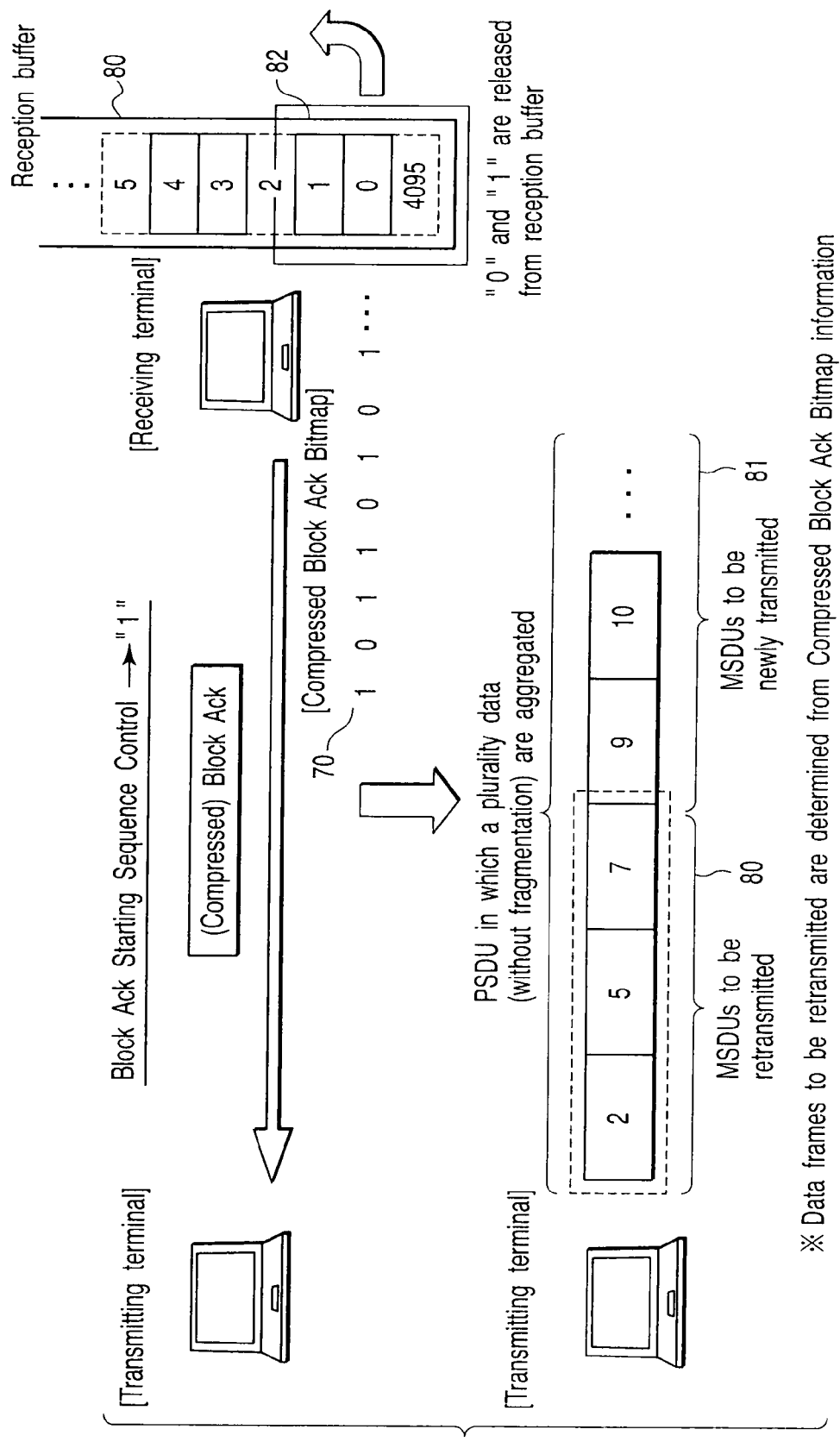
FIG. 8 is a view for explaining reception buffer management according to the first embodiment of the present invention.

Subsequently, as shown in FIG. 8, the transmitting terminal generates a physical frame having both an MPDU 80 to be retransmitted and an MPDU 81 with a new sequence number aggregated in the same PSDU, and transmits the frame. Note that how many MPDUs 81 to be newly transmitted are aggregated in the PSDU depends on the buffer size on the receiving side. In the first embodiment, each sequence number is premised on a field size of 12 bits as in the IEEE 802.11 standard, by which numbers from 0 to 4095 can be expressed. The sequence number increases one by one from 0, and returns to 0 after 4095. Assume that, as shown in FIG. 8, the receiving terminal has already stored the MPDU with sequence number "0" in the reception buffer 80 before receiving the MPDUs with sequence numbers "1" to "8". In addition, the MPDU with sequence number "0" cannot be released from the reception buffer 80 until the MPDU with sequence number "4095" is received.

According to the first embodiment of the present invention, the receiving terminal manages the reception buffer 80 in the following manner. Assume that when a physical frame in which a plurality of MPDUs are aggregated into a PSDU is received, an FCS calculation result indicates that the first MPDU in the PSDU has been successfully received. In this case, the receiving terminal manages the reception buffer 80 by using the sequence number information of this MPDU. In this case, managing the reception buffer 80 includes determining an MPDU, of the MPDUs which have already been stored in the reception buffer 80, which can be released, and extracting it from the reception buffer 80. The reception buffer 80 is corresponding to reception buffer 113 in FIG. 1.

As shown in FIG. 8, for example, upon receiving a physical frame in which the MPDUs with sequence numbers "1" to "8" are aggregated, the receiving terminal determines whether or not the FCS of the first MPDU (corresponding to the MPDU with sequence number "1") is correct. If the FCS of the first MPDU is correct, the receiving terminal sets the sequence number of this MPDU as a formal Block Ack Starting Sequence Control value. The receiving terminal then determines that MPDUs of the MPDUs stored in the reception buffer 80 which are older than the sequence number "1" can be released from the reception buffer 80. The receiving terminal extracts these MPDUs from the reception buffer 80 and forwards them to the upper layer. In this case, the upper layer is an upper protocol layer relative to the MAC layer 102 shown in FIG. 1. In this case, MPDUs 82 with sequence numbers "0" and "1" are forwarded to a link layer 103 (more specifically, LLC (Logical Link Control)). According to the first embodiment, since the terminal can extract the MPDU with sequence number "0" from the reception buffer 80 without waiting for the reception of the MPDU with sequence number "4095", the reception buffer efficiency, i.e., the MAC efficiency, can be improved. Referring to FIG. 8, since the Block Ack Starting Sequence Control value from transmitting terminal is recognized as "1", the frame of sequence number "0" preceding "1" in the reception buffer 80 is released therefrom and forwarded to the upper layer. After all the contents of the buffer are released, the frame with sequence number "1" is regarded as a frame consecutively received, and is released from the reception buffer 80.

Figure 9:
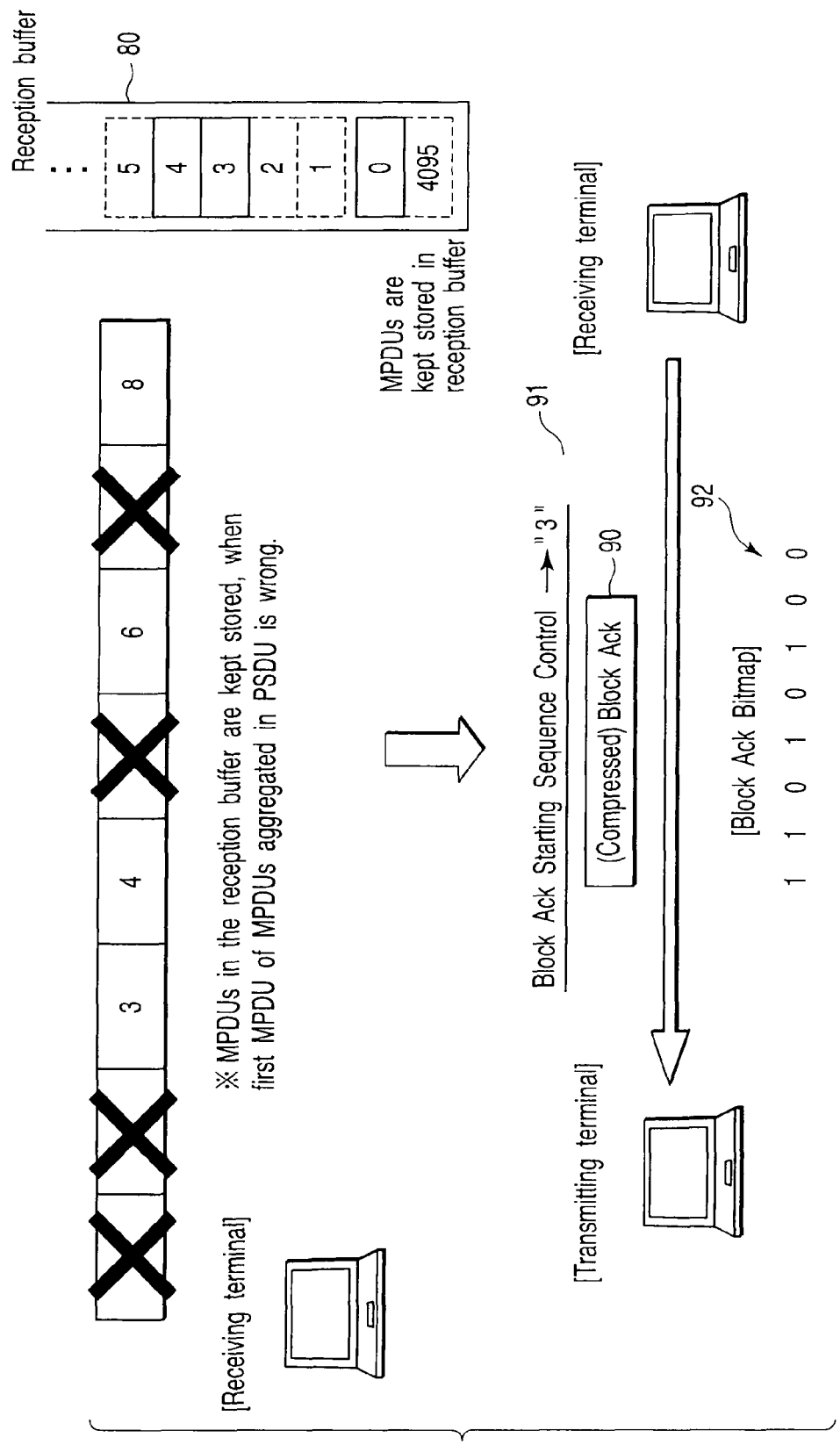
FIG. 9 is a view showing another example of reception buffer management.
Figure 10:
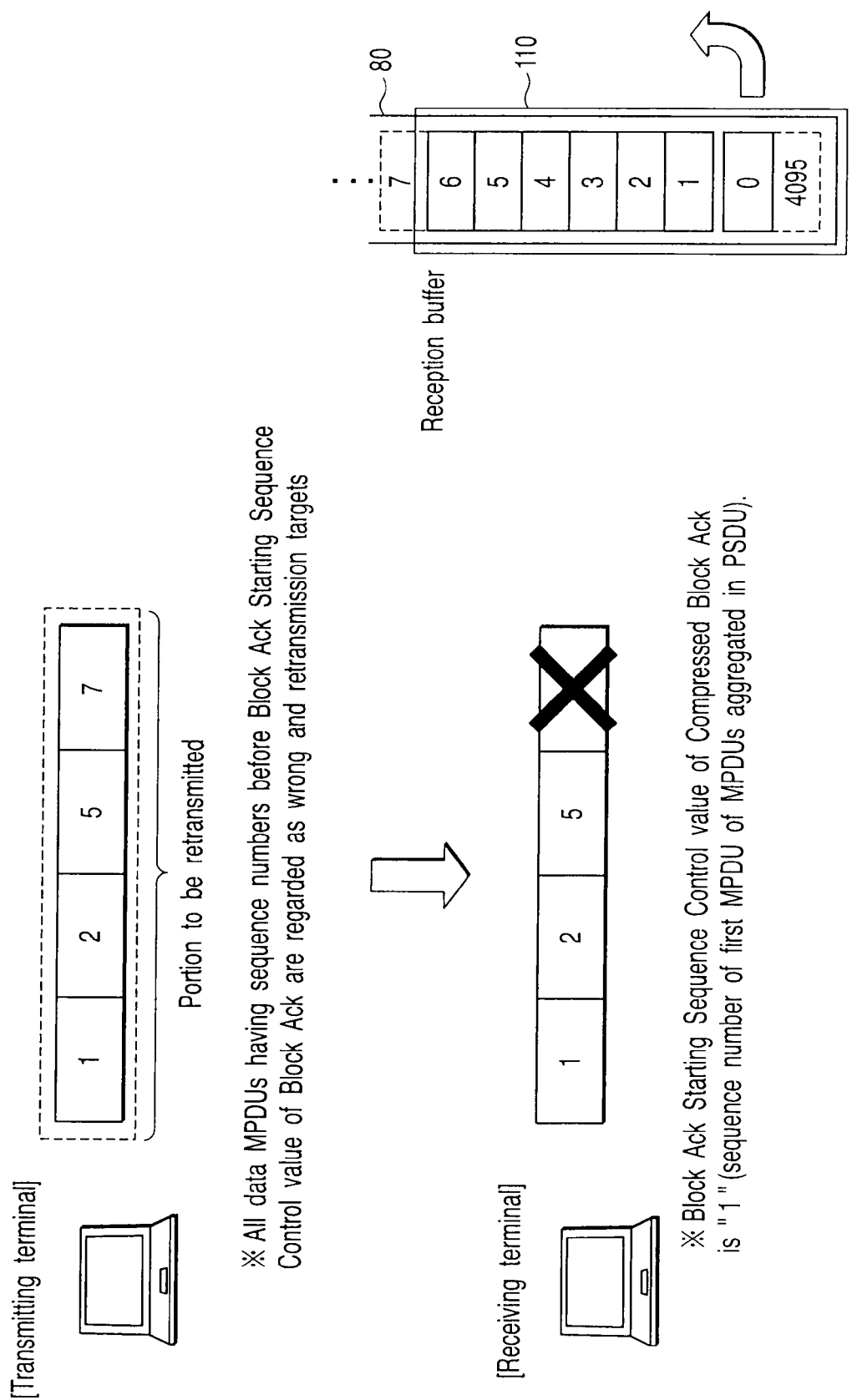
FIG. 10 is a view showing still another example of reception buffer management.

FIGS. 9 and 10 show another example of reception buffer management. As shown in FIG. 9, the terminal which has received a physical frame having MPDUs with sequence numbers "1" to "8" aggregated in a PSDU determines as a result of FCS calculation that the MPDUs with sequence numbers "3", "4", "6", and "8" have been successfully received. Assume that the terminal has already stored the MPDU with sequence number "0" while waiting for the reception of the MPDU with sequence number "4095". In this case, since the first aggregated MPDU is incorrect, information indicating up to which MPDU has been consecutively and successfully received in the receiving terminal is not updated. For this reason, the MPDUs stored in the reception buffer 80 cannot be forwarded to the upper layer at this point of time.

According to the first embodiment of the present invention, the value of the sequence number of the first MPDU, in the PSDU in which a plurality of MPDUs are aggregated, which has successfully received is written in a Block Ack Starting Sequence Control 91 of a Compressed Block Ack 90. In the example shown in FIG. 9, the MPDU with sequence number "3" is the first MPDU which has been successfully received. A Compressed Block Ack Bitmap 92 is generated with sequence number "3" being set as a starting point. In the example shown in FIG. 9, since the first aggregated MPDU is incorrect, although the terminal returns the Compressed Block Ack 90, the terminal releases no MPDU from the reception buffer 80. So, MPDUs with sequence numbers "0", "3", "4", "6" and "8" are stored in the reception buffer.

Upon receiving the Compressed Block Ack 90, the data transmitting terminal regards all MPDUs with sequence numbers before the value of the Block Ack Starting Sequence Control 91 as retransmission targets, as shown in FIG. 10. That is, in the example shown in FIGS. 9 and 10, the MPDUs with sequence numbers "1" and "2" are regarded as retransmission targets. The data transmitting terminal further determines from the Compressed Block Ack Bitmap 92 that the MPDUs with sequence numbers "5" and "7" need to be retransmitted, and transmits them upon aggregating a total of four MPDUs. At this time, "1" is set in the retransmission identifier (Retry bit filed) of the MAC header of each MPDU.

When the receiving terminal determines as a result of FCS calculation that the first MPDU of the MPDUs aggregated in the PSDU of the physical frame has been successfully received, buffer management is executed in the above manner to update the information for buffer management. The MPDU with sequence number "0" before the Block Ack Starting Sequence Control value "1" is unconditionally forwarded to the upper layer even in a situation in which MPDUs are discontinuously received in the reception buffer 80. In addition, since the MPDUs with sequence numbers "1", "2", and "5" have been successfully received as shown in FIG. 10, all the MPDUs with consecutive sequence numbers "1" to "6" can be released from the reception buffer 80 and forwarded to the upper layer. That is, seven MPDUs 110 with consecutive sequence numbers "0" to "6" are released from the reception buffer 80 and forwarded to the upper layer. In addition to the method of causing the data transmitting side to determine, on the basis of the Block Ack Starting Sequence Control value of a Compressed Block Ack, which MPDUs the terminal has failed to transmit, and transmitting data to be retransmitted upon aggregating them, a method of notifying a destination terminal of a proper Block Ack Starting Sequence Control value by transmitting only a Block Ack Request can also be applied to the present invention. In the case, in the example shown in FIGS. 9 and 10, the transmitting terminal transmits a Block Ack Request with the Block Ack Starting Sequence Control value being designated to "1", and the data receiving terminal returns a Compressed Block Ack with sequence number "1" as a starting point.

Consider a case wherein, in the example shown in FIGS. 7 and 8, the data transmitting side has not been successfully notified of the Compressed Block Ack transmitted by the data receiving terminal due to an error. In the case shown in FIG. 8, the Compressed Block Ack with the Block Ack Starting Sequence Control value "1" is transmitted. If an error occurs in this Compressed Block Ack, the transmitting side causes a timeout after a lapse of a predetermined period of time, and transmits a Block Ack Request with the Block Ack Starting Sequence Control value "1". The receiving side returns a Compressed Block Ack based on the Block Ack Starting Sequence Control value of the Block Ack Request. In this case, the receiving side can release a frame from the reception buffer 80 and forward it to the upper layer even if the receiving side has not received the retransmitted Block Ack Request. This is because, when a PSDU in which a plurality of MPDUs are aggregated is received, as long as the FCS for the first MPDU is correct, reception buffer management can be done by regarding the sequence number of the first MPDU as a Block Ack Starting Sequence Control value. When a Block Ack Request is retransmitted with the Block Ack Starting Sequence Control value being set to "1", the frames with sequence numbers "3" and "4" stored in the reception buffer 80 in FIG. 8 are not released from the buffer and are kept stored therein because their sequence numbers are newer than the Block Ack Starting Sequence Control value.

In the example shown in FIG. 7, if all the aggregated MPDUs are incorrect, the data receiving side can neither update the Block Ack starting sequence control value nor return any Compressed Block Ack. For this reason, the frame with sequence number "0" which has already been stored in the reception buffer 80 is not released from the buffer either. The data transmitting side detects a timeout after a lapse of a predetermined period of time, and transmits a Block Ack Request as a Block Ack Starting Sequence Control value. The data receiving side has not received any MPDU after sequence number "1", and hence returns the Block Ack Bitmap with all values being set to 0 as the Block Ack Starting Sequence Control value "1". At this time, the frame with sequence number "0" stored in the reception buffer 80 is released from the buffer and forwarded to the upper layer because the sequence number is before the Block Ack Starting Sequence Control value.

Figure 11:
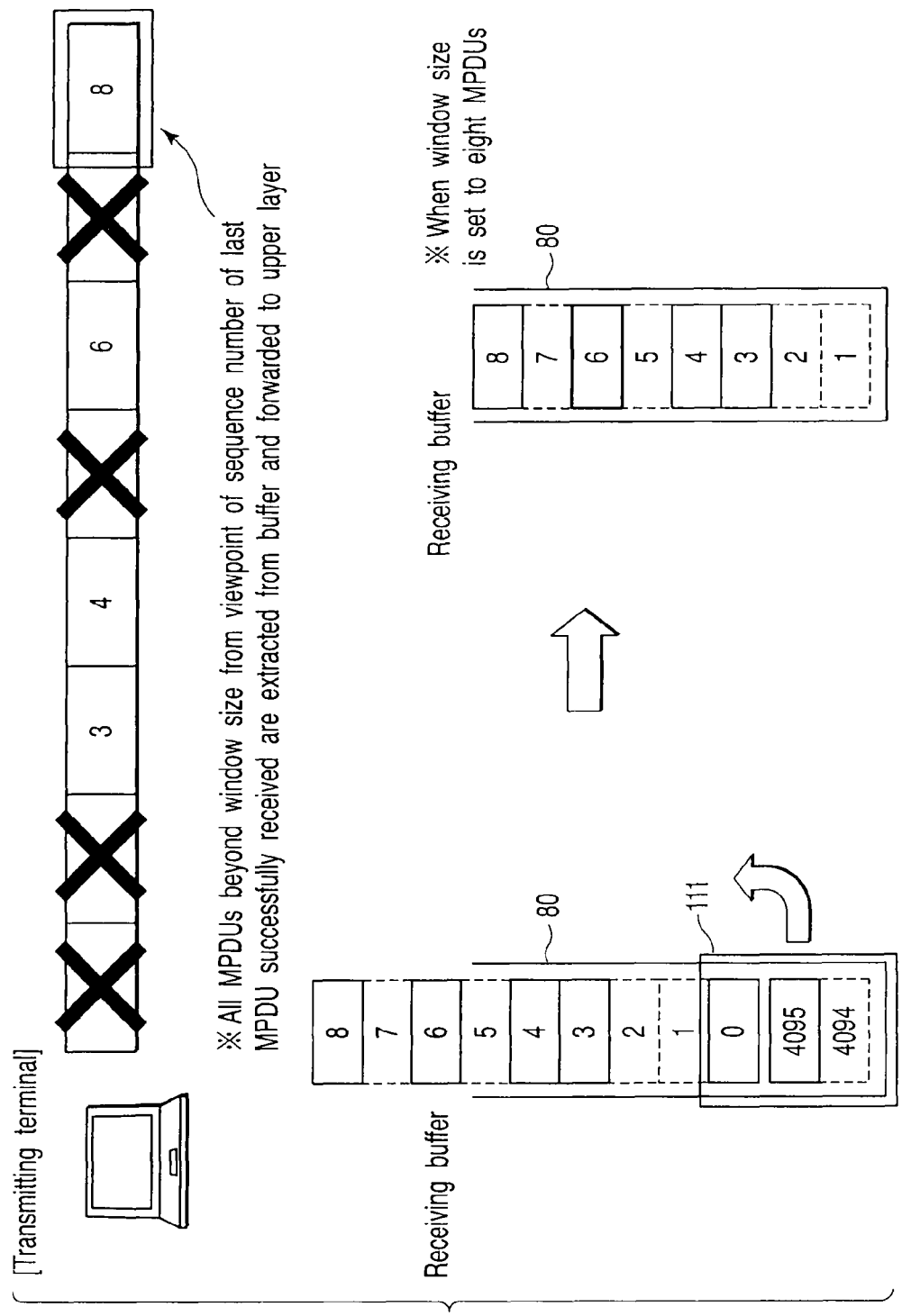
FIG. 11 is a view for explaining a buffer management technique to be executed in consideration of the window size on the receiving side.

A buffer management technique based on the consideration of the window size on the receiving side will be described with reference to FIG. 11. The window size indicates the maximum number of MPDUs which can be stored on the receiving side. In the example shown in FIG. 11, a maximum of eight MPDUs can be stored, and hence the window size is 8. Assume that MPDUs 111 with sequence numbers "4095" and "0" have already been stored in the reception buffer 80, as shown in FIG. 11. Assume that the transmitting terminal transmits new MPDUs with sequence numbers "1" to "8" upon aborting retransmission, and all the MPDUs are successfully received. In this case, the reception buffer 80 overflows.

According to the first embodiment of the present invention, therefore, in order to prevent the reception buffer 80 from overflowing, MPDUs which are not allowed to stay in the reception buffer 80 are determined on the basis of the sequence number of the last MPDU which has been successfully received and the value of the window size, and all the determined MPDUs are extracted from the reception buffer 80 and forwarded to the upper layer. More specifically, all the frames having lower sequence numbers than the sequence number preceding the last MPDU by the window size are extracted from the reception buffer 80 and forwarded to the upper layer. In the example shown in FIG. 11, since the MPDU with sequence number "8" is the last MPDU which has been successfully received, the MPDUs 111 with sequence numbers "4095" and "0" are unconditionally released from the reception buffer 80. As a consequence, only the MPDUs with sequence numbers "3", "4", "6", and "8" are stored in the reception buffer 80.

When a plurality of MPDUs are to be transmitted at once to a plurality of destinations by using the format in which the length information of the aggregated MPDUs is written in the head of the PSDU as shown in FIG. 4, each receiving terminal can regard the sequence number of the first MPDU as a Block Ack Starting Sequence Control value in a state wherein the terminal can recognize from which part of the PSDU the MPDU addressed to itself starts. That is, the first embodiment of the present invention can be applied not only to data transmission to a signal destination but also to data transmission to a plurality of destinations.

As described above, according to the first embodiment of the present invention, the reception buffer 80 can be managed in the above manner upon successful reception of the first MPDU of MPDUs aggregated in a PSDU. This makes it possible to prevent any MPDUs from undesirably staying in the reception buffer 80 and improve the reception buffer efficiency, i.e., the MAC efficiency.

Second Embodiment

The second embodiment of the present invention is directed to a communication apparatus which makes a receiving terminal clear a reception buffer by transmitting only a Block Ack Request when a transmitting terminal determines that the transmission scheduling intervals between QoS data frames or QoS CF-Poll frames are relatively long.

HCCA is associated with an extended scheme of conventional PCF (Point Coordination Function). More concretely, the HC (Hybrid Coordinator) performs bandwidth management including the allocation of TXOPs to QSTA (QoS stations). The HC is collocated with a QAP. At the start of communication, a QSTA sets up a TS (Traffic Stream). The TS is a set of MSDUs to be delivered subject to the QoS parameter values provided to the MAC in a particular TSPEC (Traffic Specification). TSPEC is the QoS characteristics of a data flow to and from a non-AP QSTA. TSs are only meaningful to MAC entities that support QoS within the MAC data service. When the setup of a TS is started, a TSPEC is notified from the QSTA. The TSPEC contains information such as a TSID (Traffic Stream Identifier) and Mean Data Rate (that specifies the average data rate specified at the MAC-SAP, in units of bits per second.) A plurality of TSs can be set. Each HC must perform scheduling so as to satisfy TS requirements. More specifically, when performing scheduling, the HC determines a transmission cycle for data to a certain destination and sends QoS CF-Poll on the basis of service interval information called "Service Interval". The QSTA obtains a TXOP period by polling from the HC. This allows the QSTA to transmit a frame during this period.

Figure 13:
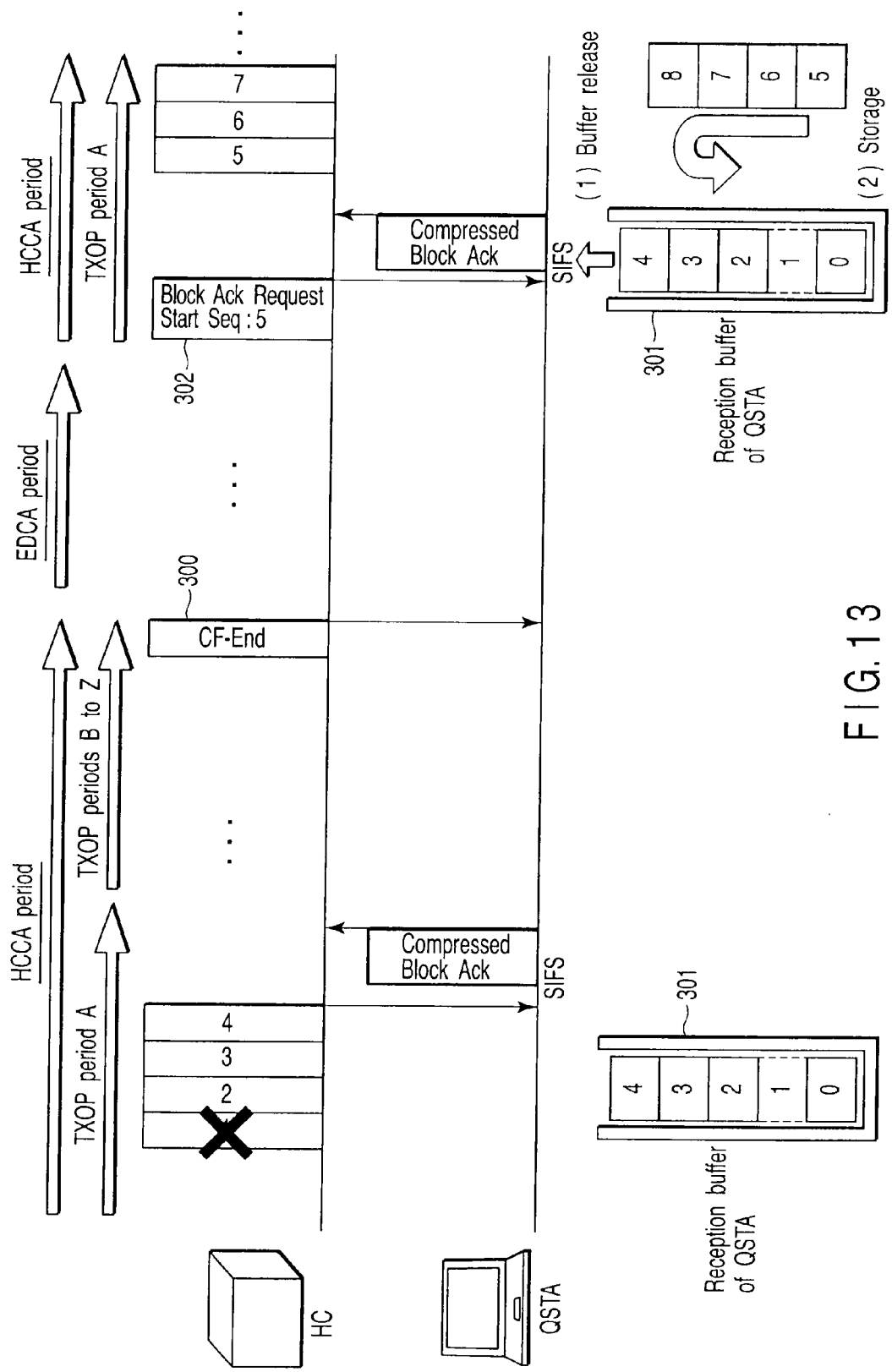
FIG. 13 is a view for explaining an example of how the reception buffer is cleared according to the second embodiment of the present invention.

The second embodiment of the present invention will be described with reference to FIGS. 12 and 13. Referring to FIG. 12, in a contention-free HCCA period, a TXOP (transmission opportunity) from an HC to a QSTA is set as a TXOP period A, and TXOP periods for transmission from the HC to other QSTAs are set as TXOP periods B to Z. At the end of the HCCA period, a CF-End (Contention Free End) frame 300 indicating the start of a contention period is broadcast. Referring to FIG. 12, assume that the HC has transmitted a plurality of MPDUs with consecutive sequence numbers "1" to "4" upon aggregating them, and the FCS calculation result indicates that the MPDU with sequence number "1" is incorrect. Assume that a reception buffer 301 of the QSTA in FIGS. 12 and 13 has a size that allows a maximum of five MPDUs to be stored, and the frame with sequence number "0" has already been stored in the reception buffer 301 of the QSTA. In this case, if the TXOP periods for the remaining QSTAs prolong, the Lifetime of a MAC frame may be exceeded. According to the IEEE 802.11e/Draft 10.0 standard, a Delay Bound is set in accordance with the priority of traffic. Any MAC frame that has exceeded the Delay Bound is discarded upon aborting transmission even if the frame needs to be retransmitted. Referring to FIG. 12, when the TXOP periods for the remaining QSTAs prolong and the MPDU with sequence number "1" which needs to be retransmitted is discarded, the QSTA cannot release the MPDUs with sequence numbers "0", "2", "3", and "4" stored in the reception buffer 301 from the buffer and forward them to the upper layer. The reception buffer 301 of the QSTA overflows unless the data transmitting side uses the method like the first embodiment which abandons retransmitting the MPDU with sequence number "1" which has exceeded the Delay Bound, transmitting the MPDUs with sequence numbers "5" to "8", and regarding the sequence number "5" as a Block Ack Starting Sequence Control value. Therefore, the MPDUs with sequence numbers "5" to "8" must be discarded before an MPDU is stored in the reception buffer 301. For this reason, as shown in FIG. 13, in the second embodiment of the present invention, if the transmitting terminal sends a block of QoS data frames for a predetermined period, a Block Ack Request is transmitted to clear the reception buffer 301. Referring to FIG. 13, in order to release frames up to sequence number "4" from the reception buffer 301, a Block Ack Request 302 with a Block Ack Starting Sequence Control value being set to "5" is transmitted at the start of the second TXOP period A (TXOP for data transmission to the QSTA). According to the IEEE 802.11e/Draft 10.0 standard, since all MAC frames having sequence numbers lower than the Block Ack Starting Sequence Control value need to be released from the reception buffer and forwarded to the upper layer, the frames with sequence numbers "0", "2", "3", and "4" are released from the reception buffer 301. Even if the MPDUs with sequence numbers "5" to "8" are transmitted afterward, there is no chance that the buffer will flow.

Another example of the second embodiment of the present invention will be described with reference to FIGS. 14 to 16. Assume that, as shown in FIG. 14, the HC transmits MPDUs with sequence numbers "1" to "4" and a Block Ack Request with an Block Ack Starting Sequence Control value being set to "1" are transmitted upon aggregating them into one PSDU in the TXOP period A. Assume that one of the aggregation methods shown in FIGS. 4 and 5 in the first embodiment described above is used. In this case, if the FCS of the MPDU with sequence number "1" is incorrect, the MPDUs with sequence numbers "2" to "4" are stored in the buffer on the receiving side. A cycle in which data is transmitted to a QSTA 1 is based on the SI (Service Interval) of the QSTA 1. The SI is the interval between the start of two successive scheduled SP (Service Periods). A SP is a contiguous time during which one or more downlink unicast frames are transmitted to a QSTA and/or one or more TXOPs are granted to the same QSTA. SPs can be scheduled or unscheduled. The scheduled service period is scheduled by the QAP, and starts at fixed intervals of time. As the service start timing for a QSTA 2 approaches, data transmission to the QSTA 2 must be started while transmission to the QSTA 1 is interrupted for a while. If this state continues, the MPDUs with sequence numbers "2" to "4" stored in the reception buffer of the QSTA 2 will be wasted.

In the second embodiment of the present invention, therefore, if the remainder of the TXOP period (channel use permission period) is too short to retransmit the incorrect MPDUs, only a Block Ack Request is transmitted to the destination terminal to clear the reception buffer of the destination terminal and forward all the MPDUs to the upper layer.

In the example shown in FIG. 14, the Block Ack Starting Sequence Control value of a Block Ack Request 120 to be transmitted just before the end of a TXOP period A is "5", and when the HC transmits the Block Ack Request 120, the QSTA 1 which is the destination terminal assigned with the TXOP period A forwards all the MPDUs with sequence numbers "2" to "4" to the upper layer.

Operation in a TXOP period B following the TXOP period A is similar to that described above. In the TXOP period B, the HC transmits MPDUs with sequence numbers "1001" to "1003" and a Block Ack Request with a Block Ack Starting Sequence Control value being set to "1001" to the QSTA 2 upon aggregating them. The QSTA 2 is a destination terminal different from the QSTA 1. If it is determined as a result of FCS calculation that the MPDU with sequence number "1001" is incorrect, the MPDUs with sequence numbers "1002" and "1003" are stored in the reception buffer in the QSTA 2 and cannot be forwarded to the upper layer. When a Block Ack 121 is returned to the HC, the HC determines that the MPDU with sequence number "1001" needs to be retransmitted. However, since the remainder of a predetermined contention-free HCCA period is small, and an EDCA period during which contention is performed approaches, the HC cannot afford to perform retransmission processing.

In general, in an HCCA period, traffic with high priorities which require scheduling is transmitted, and in an EDCA period (contention period), best-effort type traffic with relatively low priority is transmitted. When the HCCA period switches to the EDCA period, therefore, the HC may transmit data with different priorities which are addressed to a destination different from the QSTA 2 upon aggregating them.

In the second embodiment, when the EDCA period starts, the HC transmits, to the QSTA 2, a Block Ack Request 122 to clear the reception buffer, with the highest priority. In EDCA, a plurality of ACs (Access Categories) are provided for the respective priorities, which concurrently perform CSMA/CA in parallel. Each AC has its own IFS (AIFS) period. ACs with higher priorities enable the start of transmission of a frame by carrier sense for shorter periods of time. When transmission processing simultaneously occurs between a plurality ACs within MAC layer, a frame in an AC with a high priority is transmitted, and an AC with a low priority is set in a random backoff wait time again upon increasing the CW (Contention Window). In the example shown in FIG. 14, immediately after the start of the EDCA period, the Block Ack Request 122 to make the QSTA 2 clear the reception buffer is set in the head of a transmission queue in the AC with the highest priority. This makes it possible to transmit the Block Ack Request 122 to the QSTA 2 before the HC transmits data to another terminal (and/or another priority) in the EDCA period. The MPDUs with sequence numbers "1002" and "1003" stored in the reception buffer of the QSTA 2 are forwarded to the upper layer before the arrival of the MPDU with sequence number "1001". In this case, the transmitting side preferably designates an appropriate value as the Block Ack Starting Sequence Control value of the Block Ack Request 122 to clear the reception buffer. If, for example, it is determined that the delay limits of MPDUs (which are decided with respect to each application) stored in the buffer on the receiving side will be exceeded, they are forwarded to the upper layer even when the sequence numbers are discontinuous.

Figure 15:
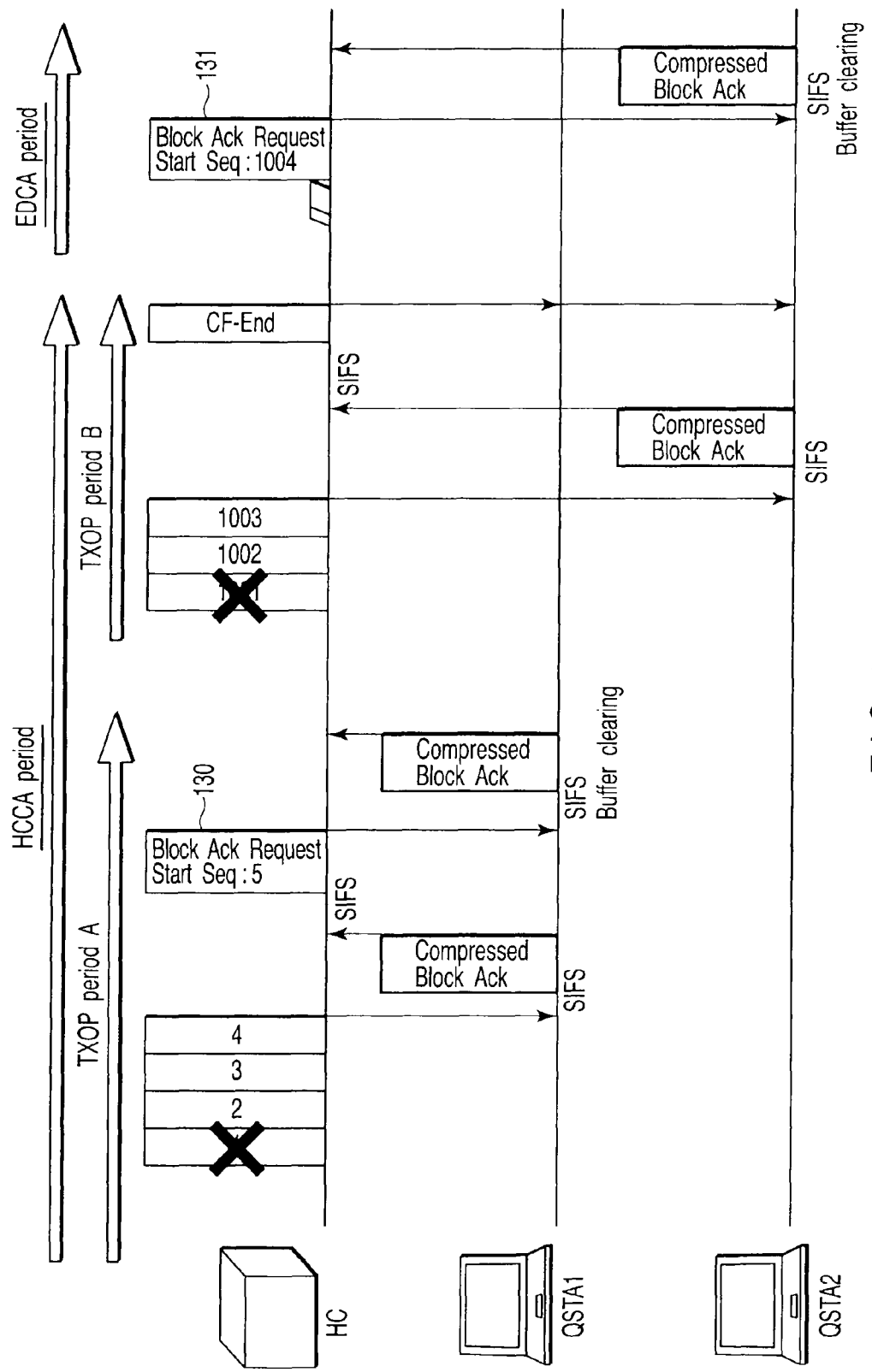
FIG. 15 is a view for explaining still another example of how the reception buffer is cleared according to the second embodiment of the present invention.
Figure 16:
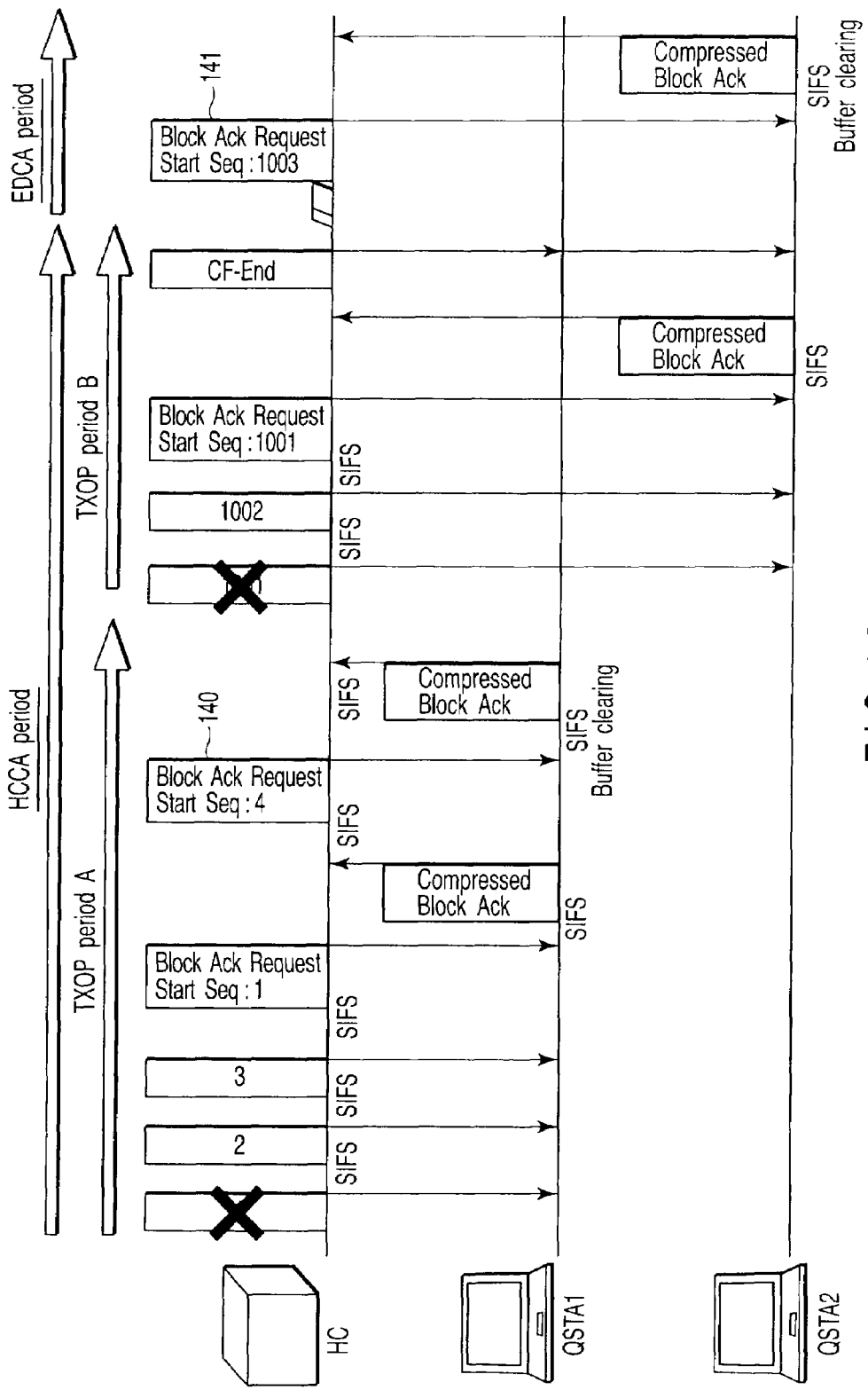
FIG. 16 is a view for explaining still another example of how the reception buffer is cleared according to the second embodiment of the present invention.

FIG. 15 shows an example of how the present invention is applied to a case wherein a plurality of MPDUs are transmitted after being aggregated without containing any Block Ack Request. This procedure will be referred to as a "Implicit Block Ack Request" hereinafter. The HC transmits an explicit Block Ack Request 130 to the QSTA 1 to make it clear the reception buffer. Likewise, the HC transmits an explicit Block Ack Request 131 to the QSTA 2. FIG. 16 shows an example of how the present invention is applied to the Block Ack technique defined in IEEE 802.11e. The HC forwards a Block Ack Request 140 to the QSTA 1 to make it clear the reception buffer. Likewise, the HC transmits an explicit Block Ack Request 141 to the QSTA 2.

According to the second embodiment of the present invention, if the remainder of an HCCA period is small, and retransmission processing cannot be performed because an EDCA period approaches, an HC transmits a Block Ack Request to clear the reception buffer. This makes it possible to prevent MPDUs from undesirably staying in the reception buffer and improve the reception buffer efficiency, i.e., the MAC efficiency. Obviously, the second embodiment of the present invention can be applied not only to downlink transmission from an HC to a QSTA but also to uplink transmission from a QSTA to an HC.

The second embodiment of the present invention can also be applied to data transmission in an EDCA period in the contention-based QoS access control scheme. When EDCA is used, strict schedule management as in HCCA cannot be done. For this reason, a terminal which transmits data checks the contents of a transmission queue for each AC. Upon determining that an opportunity to transmit data to the current destination will not be available for a while, the terminal transmits a Block Ack Request to release the reception buffer at the end of the TXOP period, thereby properly performing buffer management. MAC frames are extracted from a transmission queue according to the FIFO (First In First Out) principle by searching the queue from its head. For this reason, as a frame to the destination is stored closer to the end of the queue, the frame is transmitted at a later time. The second embodiment may also use a method of transmitting a Block Ack Request to release the reception buffer at the start of a TXOP period if a predetermined period of time has elapsed at the start of a new EDCA period since the end of the preceding EDCA period. According to IEEE 802.11-Standard 1999, the More Data field of the MAC header with 1 bit length is used to indicate to a STA in power-save mode that more MSDUs, MMPDUs (management MPDUs) are buffered for that STA at the AP. This field is valid in directed data or management type frames transmitted by an AP to a STA. If there is succeeding data or a succeeding management frame with respect to the terminal (station) from the viewpoint of an access point, this flag is set to 1. If no succeeding frame is present, the flag is set to 0. If the More Data flag is set to 0, the terminal which has received the frame shifts to the power save mode. The data frame receiving terminal may manage the reception buffer according to the Block acknowledgement procedures defined in IEEE 802.11e/Draft 10.0 while this more data flag is set to 1. The terminal may also release frames from the reception buffer and forward them to the upper layer, when the flag is set to 0, upon determining that no data addressed to itself will be transmitted for a while. This method can be applied to data transmission in both an EDCA period and an HCCA period. The second embodiment of the present invention can prevent MPDUs from undesirably staying in the reception buffer, thereby improving the reception buffer efficiency, i.e., the MAC efficiency.

Third Embodiment

The third embodiment of the present invention is directed to a method of creating a Block Ack Bitmap contained in a Block Ack. The maximum length of the Block Ack Bitmap in the Compressed Block Ack described in the first embodiment is 64 bits. However, the size of the Compressed Block Ack can be further reduced by matching the Compressed Block Ack Bitmap to the size of the reception buffer. In this case, transmitting terminal and receiving terminal should negotiate the information about the size of Compressed Block Ack Bitmap corresponds to the size of reception buffer. Assume that the size of the reception buffer is set to correspond to eight MPDUs. In this case, a maximum of eight MPDUs can be aggregated in a single PSDU in a physical frame to be transmitted by a transmitting terminal, and hence the Compressed Block Ack Bitmap size is eight bits.

Figure 17:
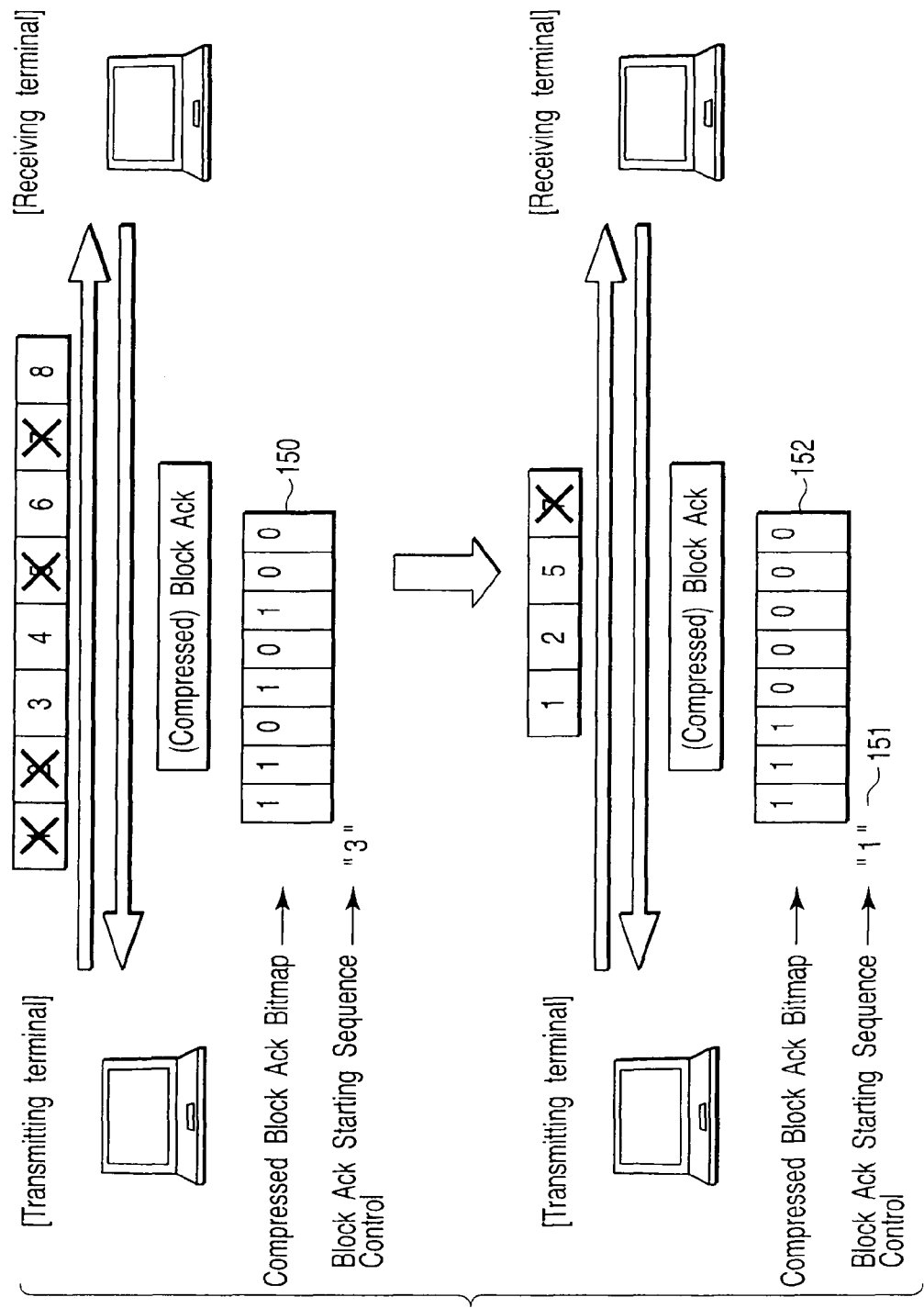
FIG. 17 is a view showing an example of the creation of a Compressed Block Ack Bitmap.

Assume that, as shown in FIG. 17, a transmitting terminal transmits MPDUs with consecutive sequence numbers "1" to "8", and errors in the MPDUs with sequence numbers "1", "2", "5", and "7" are detected by an FCS check. When the receiving terminal creates a Compressed Block Ack Bitmap 150 for a Compressed Block Ack, the Compressed Block Ack Bitmap 150 is expressed as "11010100" with the Block Ack Starting Sequence Control value "3" being a starting point. As described above, the Block Ack Starting Sequence Control value of a Compressed Block Ack is equal to the sequence number of the first MPDU of the MPDUs aggregated in a PSDU, which has been properly received. Upon receiving the Compressed Block Ack having the Compressed Block Ack Bitmap 150, the transmitting terminal transmits (retransmits) a physical frame in which the MPDUs with sequence numbers "1", "2", "59", and "7" whose transmission has failed are aggregated in one PSDU. In this case, the sequence numbers of the MPDUs aggregated in the PSDU are discontinuous. Assume that even after this retransmission, the MPDU with sequence number "7" is incorrect on the receiving terminal side, and a Block Ack Bitmap is to be created from the relative positional relationship between the MPDUs. In this case, the value of Block Ack Starting Sequence Control 151 of a Compressed Block Ack is set to "1", and a Compressed Block Ack Bitmap 152 is created as "11100000" with "1"s being packed from the head. And the size of Compressed Block Ack Bitmap can be reduced to 8 bits.

Figure 18:
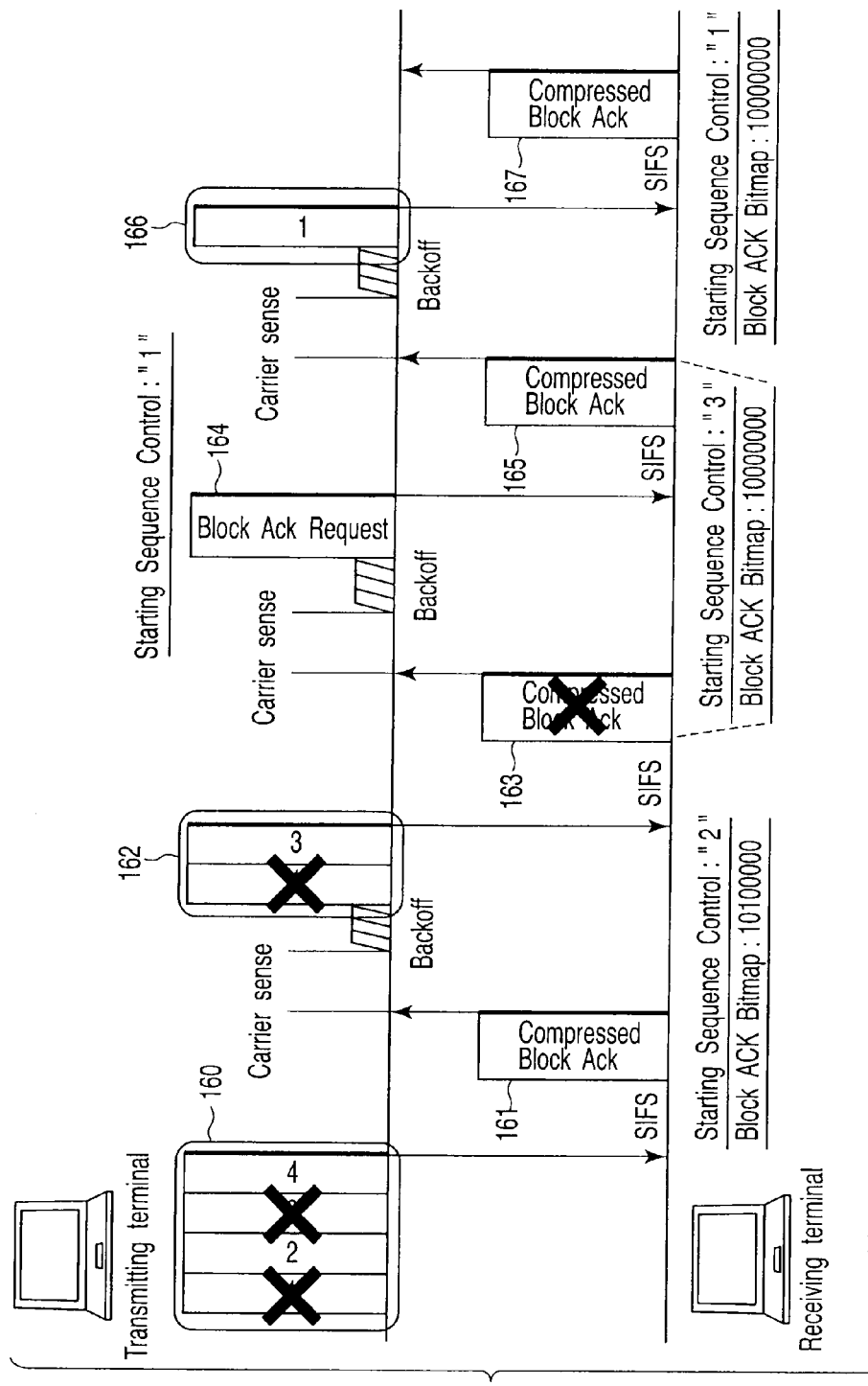
FIG. 18 is a view showing a retransmission sequence based on a Compressed Block Ack Bitmap.

FIG. 18 shows how frames are exchanged when a Compressed Block Ack Bitmap is to be created from the relative positional relationship between MPDUs. The data transmitting side transmits a physical frame 160 in which a plurality of MPDUs are aggregated into one PSDU. Assume that no Block Ack Request is contained in the physical frame 160 (Implicit Block Ack Request). Assume that a result of FCS calculation in the receiving terminal indicates the MPDUs with sequence numbers "1" and "3" are incorrect. Since the sequence number of the first MPDU which has been successfully received is "2", the receiving terminal sets the Block Ack Starting Sequence Control value to "2", and creates a Compressed Block Ack Bitmap from the relative positional relationship between MPDUs in the aggregated PSDU with "2" being a starting point, thus transmitting a Compressed Block Ack 161. In the example shown in FIG. 18, the Compressed Block Ack Bitmap is set as "10100000". And the size of Compressed Block Ack Bitmap is 8 bits which corresponds to the size of reception buffer. Upon receiving the Compressed Block Ack 161, the data transmitting terminal performs CSMA/CA procedure, and then transmits a physical frame 162 upon aggregating the MPDUs with sequence numbers "1" and "3" which need to be retransmitted. The example shown in FIG. 18 is premised on the contention-based access control scheme. Obviously, however, the present invention can be applied to a contention-free access control scheme. If the MPDU with sequence number "1" is determined incorrect on the receiving side afterward, the receiving terminal transmits a Compressed Block Ack 163 upon setting the Block Ack Starting Sequence Control value to "3" and the Block Ack Bitmap as "10000000". In this case, if an error has occurred in the Compressed Block Ack 163 on the transmission channel, the data transmitting side performs CSMA/CA procedure and then transmits a Block Ack Request 164 upon setting the Block Ack Starting Sequence Control value to "1". Since the Block Ack Starting Sequence Control value is smaller than the sequence number of the newest MPDU which has been received by the receiving terminal, i.e., "4" in the example shown in FIG. 18, the receiving terminal automatically returns an Ack (Compressed Block Ack 165) having the same contents as those of the previously transmitted Compressed Block Ack (163 in the example shown in FIG. 18). The Block Ack Starting Sequence Control value of the Compressed Block Ack 165 is "3", and the Block Ack Bitmap is "10000000". The data transmitting terminal then determines that the MPDU with sequence number "1" is incorrect, and retransmits a physical frame 166 containing the MPDU. The transmitting terminal then receives a Compressed Block Ack 167. When a Compressed Block Ack is to be returned, the receiving terminal reflexively returns the reception status of a maximum of one past PSDU without searching a reception status as in the Block acknowledgement technique defined in IEEE 802.11e. The transmitting side determines MPDUs to be retransmitted on the basis of the Block Ack Starting Sequence Control value of the Compressed Block Ack.

Figure 19:
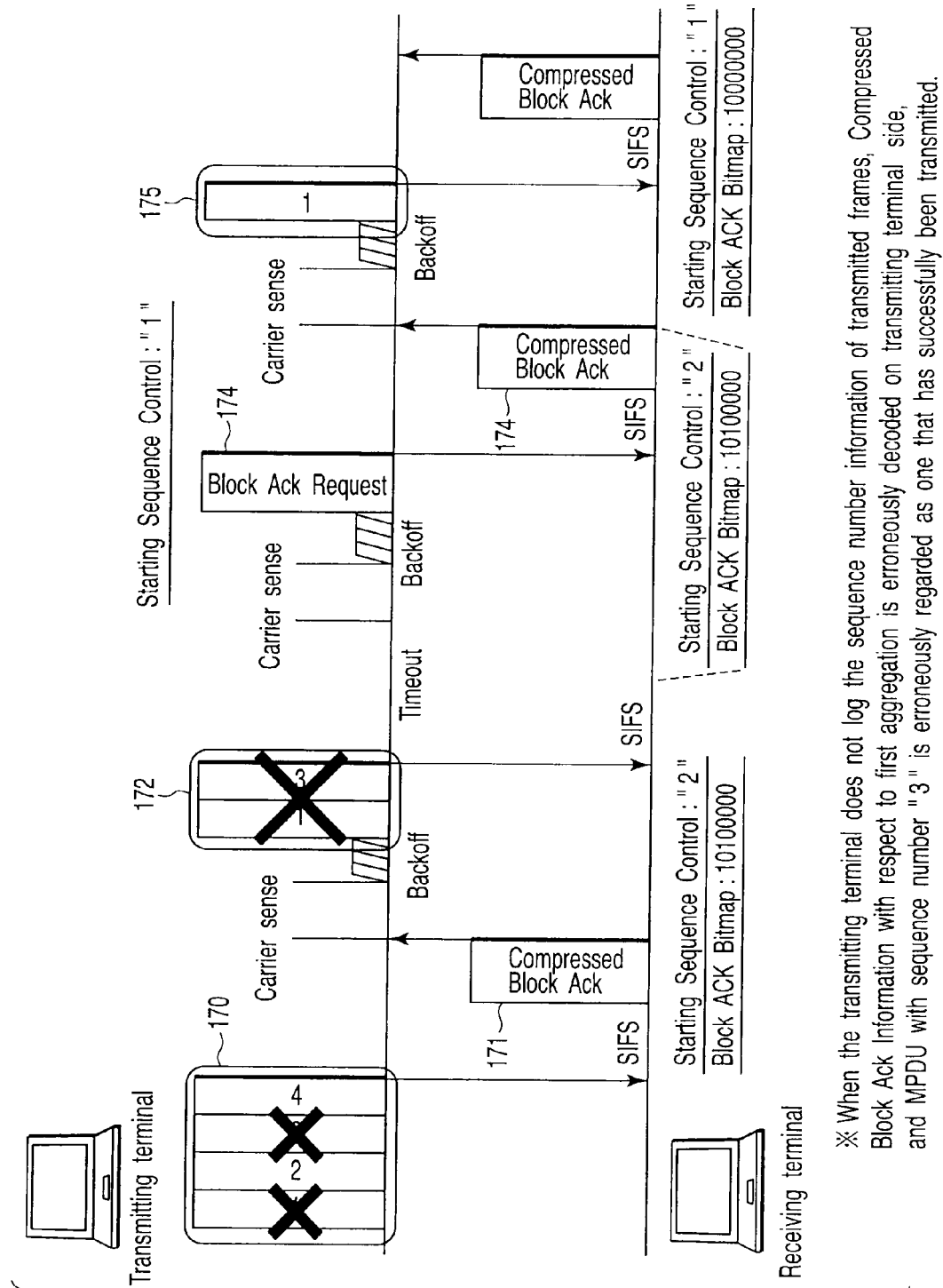
FIG. 19 is a view showing errors in retransmitted frames.

FIG. 19 shows another example of creating a Compressed Block Ack Bitmap from the relative positional relationship between MPDUs. As in the example shown in FIG. 18, the data transmitting terminal transmits a physical frame 170 in which MPDUs with sequence numbers "1" to "4" are aggregated, receives a Compressed Block Ack 171, and retransmits a physical frame 172 in which the MPDUs with sequence numbers "1" and "3" are aggregated. If the physical frame 172 in which the MPDUs with sequence numbers "1" and "3" are aggregated is destroyed by collision or the like, the receiving terminal cannot create a new Compressed Block Ack Bitmap because it has received no MPDU. In the transmitting terminal, therefore, the wait period for a Compressed Block Ack causes a timeout, and the transmitting terminal transmits a Block Ack Request 173 with the Block Ack Starting Sequence Control value being set to "1". Upon receiving the Block Ack Request 173, the receiving terminal reflexively returns a Compressed Block Ack with the same contents as those of the previously transmitted Compressed Block Ack with "2". In this example, since the Block Ack Starting Sequence Control value is "2", the receiving terminal transmits a Compressed Block Ack 174 in which a Block Ack Bitmap is set as "10100000" from the relative positional relationship between MPDUs with "2" being a starting point.

In this case, since all MPDUs with sequence numbers before the Block Ack Starting Sequence Control value of the received Compressed Block Ack 174 are considered to have failed, the transmitting terminal can determine that the MPDU with sequence number "1" is a retransmission target. However, since the Compressed Block Ack Bitmap is created from the relative positional relationship between MPDUs in the aggregated PSDU, the MPDU with sequence number "3" which is equal to or larger than the Block Ack Starting Sequence Control value is erroneously decoded by the transmitting terminal as one that has been correctly transmitted from the information "10100000" of the Block Ack Bitmap. In this case, the Compressed Block Ack Bitmap is created from the relative position the first bit "1" corresponds to the MPDU with sequence number "3". As a result, although the MPDU with sequence number "1" is retransmitted at the next transmission timing, the MPDU with sequence number "3" is not contained in the frame (physical frame 175).

In the third embodiment of the present invention, the problem that an MPDU to be retransmitted is improperly excluded from retransmission targets is handled by one of three kinds of methods to be described below.

Figure 20:
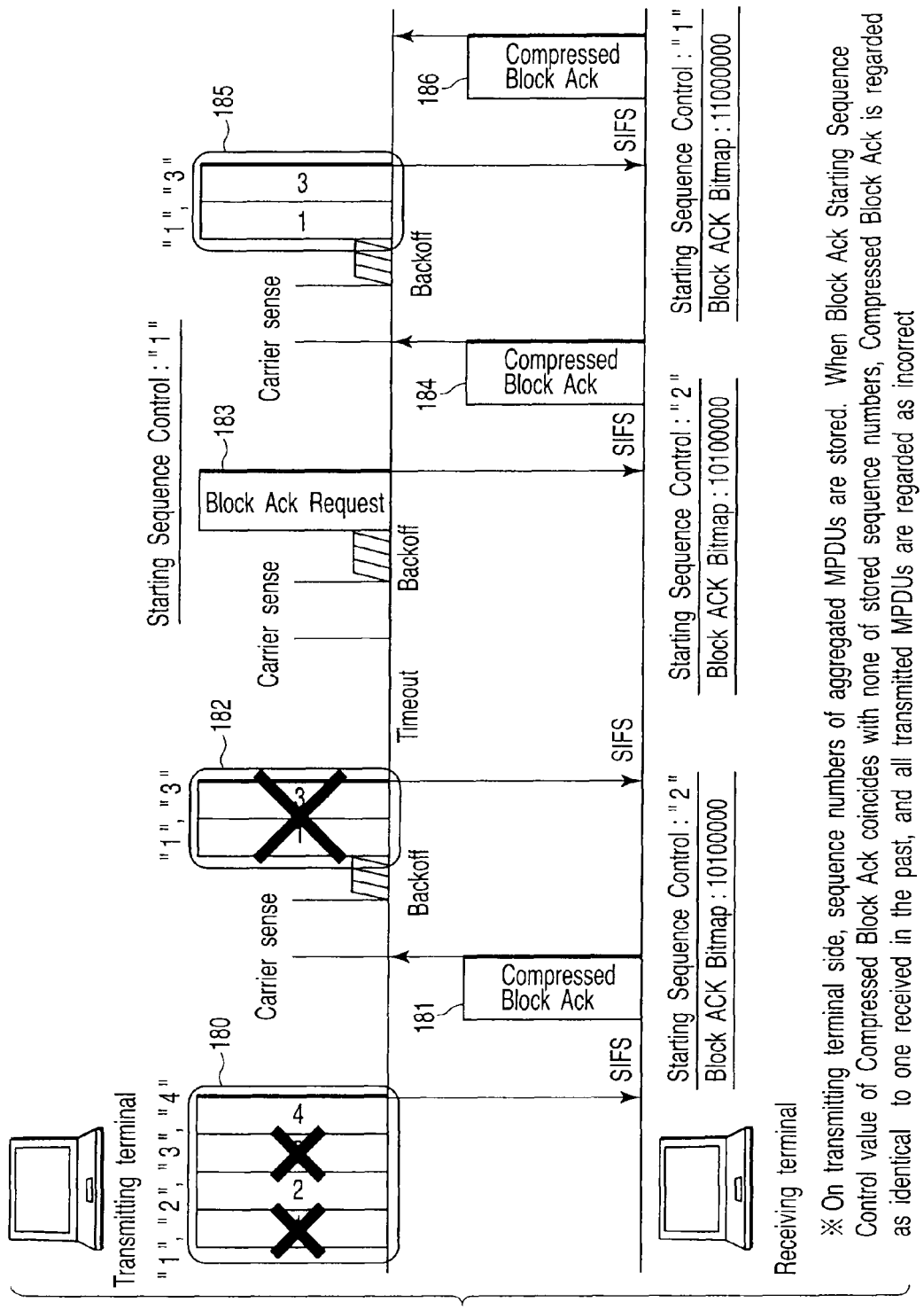
FIG. 20 is a view showing an example of Block Ack Control according to the third embodiment of the present invention.

The first method will be described first with reference to FIG. 20. A terminal which has transmitted a plurality of MPDUs upon aggregating them stores each sequence number as information.

First of all, the transmitting terminal transmits a physical frame 180 in which MPDUs with consecutive sequence numbers "1" to "4" are aggregated, and then stores all sequence numbers information "1", "2", "3", and "4". Thereafter, the transmitting terminal receives a Compressed Block Ack 181 with the Block Ack Starting Sequence Control value being "2". In this case, the transmitting terminal determines whether or not the Block Ack Starting Sequence Control value can be used to determine frames to be retransmitted. In this case, since the Block Ack Starting Sequence Control value "2" of the received Compressed Block Ack 181 coincides with stored sequence number "2", this value is used. In other words, frames to be retransmitted are determined on the basis of the Compressed Block Ack 181. With this operation, the transmitting terminal transmits the MPDUs with sequence numbers "1" and "3" as retransmission targets upon aggregating them. The transmitting terminal also updates the stored sequence number information to "1" and "3". If a physical frame 182 in which these MPDUs are aggregated is incorrect as a whole, the transmitting terminal receives a Compressed Block Ack 184 with the Block Ack Starting Sequence Control value being "2" after transmitting a Block Ack Request 183. In this case, sequence number "2" coincides with neither of sequence number "1" and "3" of the MPDUs aggregated by the data transmitting terminal. For this reason, the transmitting terminal determines that the Compressed Block Ack 184 is identical to the Compressed Block Ack 181 received in the past, i.e., the retransmitted Compressed Block Ack 181, and determines that errors have occurred in all the MPDUs (the MPDUs with sequence numbers "1" and "3" in this case) transmitted by the transmitting terminal. More properly, the transmitting terminal searches the sequence number information "2" in the stored information. That is, unlike in the above example, frames to be retransmitted are not determined on the basis of the Compressed Block Ack 181. Instead, the transmitting terminal transmits the MPDUs with sequence numbers "1" and "3" again upon aggregating them, and stores "1" and "3" as sequence number information. In this case, if the transmitting terminal receives a Compressed Block Ack 186 with the Block Ack Starting Sequence Control value being "1", the terminal recognizes the information as correct information, and knows that the transmission has succeeded.

Figure 21A:
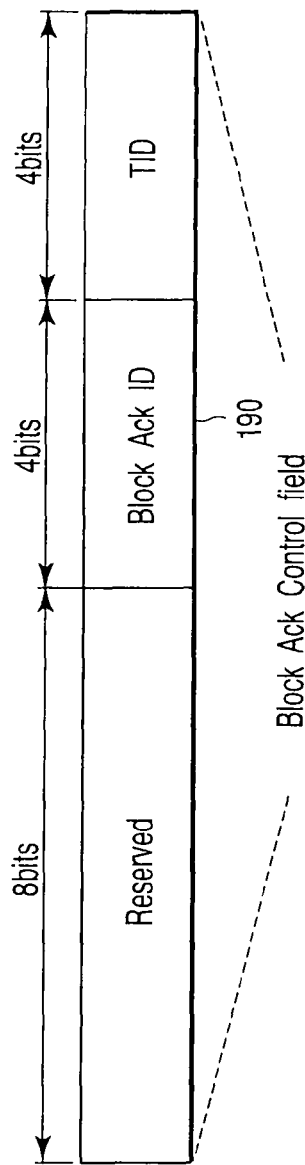
FIGS. 21A and 21B are views showing a Block Ack Control field according to the third embodiment of the present invention.

According to the second method, serial numbers are assigned to Compressed Block Acks to prevent past Block Ack frame information from being erroneously handled. According to IEEE 802.11e/Draft 12.0, a 16-bit field called a Block Ack control field exists in a Block Ack Request frame and Block Ack frame. This field includes a 4-bit TID field. The remaining portion is a reserved portion. As shown in FIG. 21A, therefore, a 4-bit Block Ack ID (acknowledgement identifier) field 190 is newly defined.

Figure 21B:
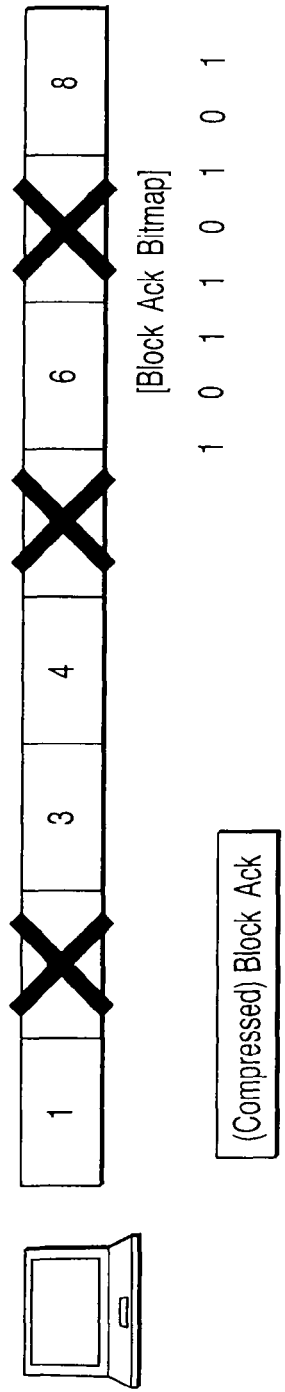

As shown in FIG. 21B, every time a physical frame in which a plurality of MPDUs are aggregated and a Compressed Block Ack Bitmap is newly created, the Block Ack ID field 190 is updated. Note that the size of the Block Ack ID field 190 is set to be four bits. Obviously, however, the Block Ack ID field 190 is not limited to this size.

Figure 22:
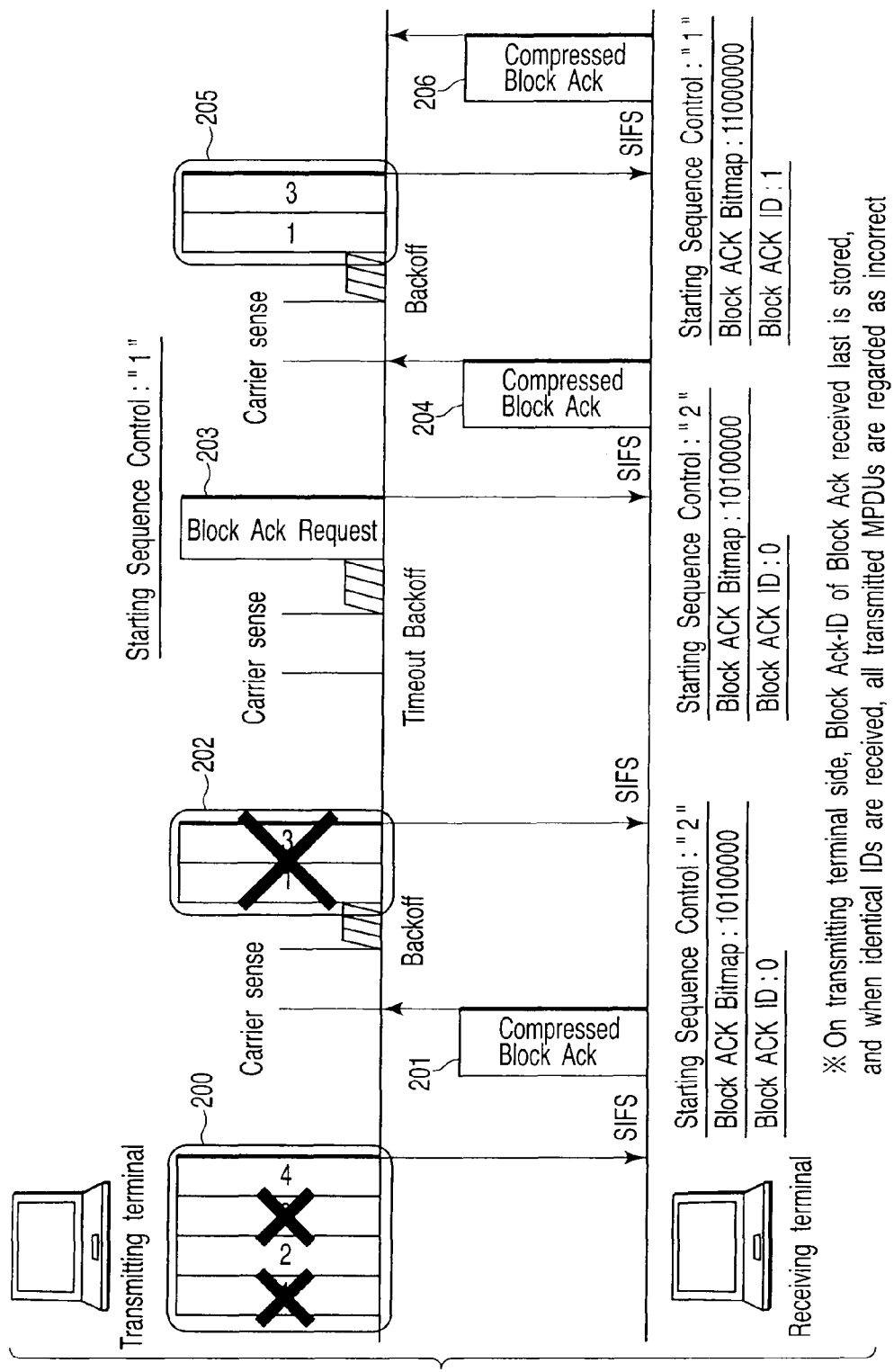
FIG. 22 is a view showing another example of Block Ack control according to the third embodiment of the present invention.

FIG. 22 shows an example of how frames are exchanged when a Block Ack ID field is used. First of all, assume that when the receiving terminal receives a physical frame 200 in which MPDUs with sequence numbers "1" to "4" are aggregated and returns a Compressed Block Ack 201, the terminal sets the Block Ack ID to 0. The data transmitting side receives the Compressed Block Ack 201 and holds the value of the Block Ack ID in the Compressed Block Ack 201. Assume that the MPDUs with sequence numbers "1" and "3" are aggregated as MPDUs to be retransmitted, but a physical frame 202 is destroyed as a whole. When the data transmitting terminal transmits a Block Ack Request 203 and then receives a Compressed Block Ack 204 with the Block Ack ID being 0, the terminal can recognize that the frame of the Compressed Block Ack 204 has the same contents as those of a frame received in the past, and regards that the transmission of all the MPDUs (i.e., all the MPDUs aggregated in the physical frame 202) has failed.

Subsequently, the MPDUs with sequence numbers "1" and "3" are retransmitted (physical frame 205). When newly creating a Compressed Block Ack 206, the receiving terminal updates the value of the Block Ack ID to 1. Since the Block Ack ID is updated, the transmitting terminal determines that the information of the Compressed Block Ack 206 is correct. In the example shown in FIG. 21A, since the Block Ack ID is four bits, this value returns to 0 after 7.

In the third method, upon receiving a Compressed Block Ack, a data transmitting terminal stores all the information or a copy of the frame itself. The application of the third method is conceptually the same as that of the first method. According to this method, it is determined by the collation of the bit string of a Compressed Block Ack whether or not it was received in the past.

Figure 23:
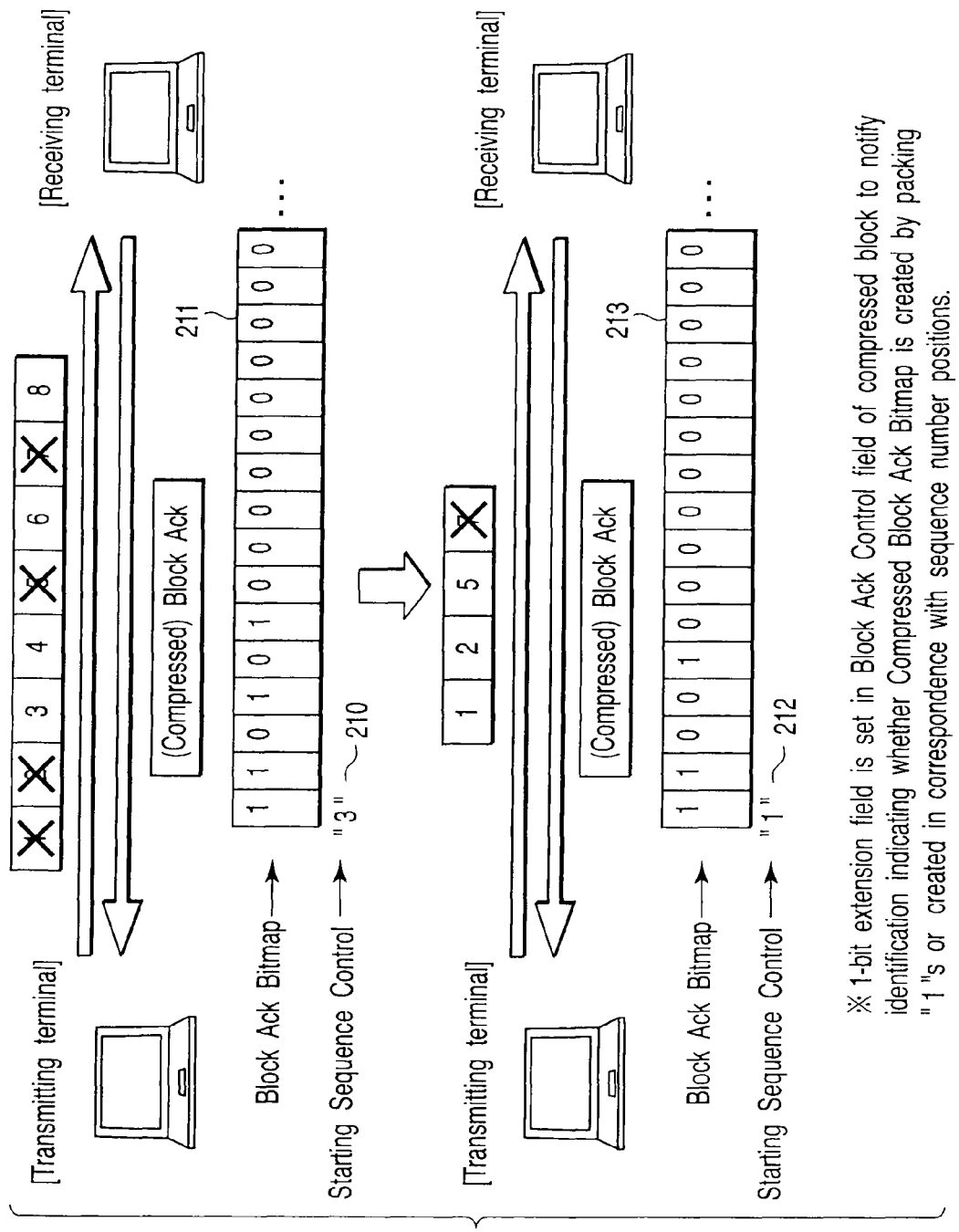
FIG. 23 is a view showing a case wherein a Compressed Block Ack Bitmap is created in correspondence with sequence number numbers.

In addition to the method of creating a Compressed Block Ack Bitmap from the relative positional relationship between MPDUs, a method of creating a Compressed Block Ack Bitmap in correspondence with sequence numbers is available. This method will be described with reference to FIG. 23. Assume that, as shown in FIG. 23, the data transmitting terminal transmits MPDUs with sequence numbers "1" to 11811 upon aggregating them. If the FCS calculation result obtained by the receiving terminal indicates that the MPDUs with sequence numbers "1", "2", "5", and "7" are incorrect, a Block Ack Starting Sequence Control 210 is set to 11311, and a Block Ack Bitmap 211 is set as "11010100000 . . . ". In this case, the Block Ack Bitmap 211 has a fixed length of 64 bits. According to IEEE 802.11e/Draft 10.0, the maximum number of MSDUs which can be consecutively transmitted by the Block Ack technique is 64, and the bitmap can be compressed to 64 bits as in the first embodiment described above on the premise that no fragmentation of MSDU is performed. Thereafter, the data transmitting terminal transmits the MPDUs sequence numbers "1", "2", "5", and "71" upon aggregating them on the basis of the contents of the Compressed Block Ack.

The receiving side then determines that the MPDU with sequence number "7" is incorrect. The value of a Block Ack Starting Sequence Control 212 is equal to the sequence number of the first aggregated MPDU, i.e., "1", and the reception status of each MPDU is converted into a bitmap with "1" being a starting point. That is, since the MPDUs with sequence numbers "1", "2", and "5" have been successfully received, a Block Ack Bitmap 213 is expressed as "11001000 . . . ". The physical frame received by the receiving terminal at this point of time does not contain the MPDUs with sequence numbers "3" and "4", and the corresponding bits of the Compressed Block Ack Bitmap 213 are kept to be 0. In addition, since the reception of the MPDU with sequence number "7" has failed, the corresponding bit is kept to be 0. Note that when a bit configuration is mutually recognized by both a transmitting terminal and a receiving terminal, negative logic may be used in place of positive logic.

Figure 24:
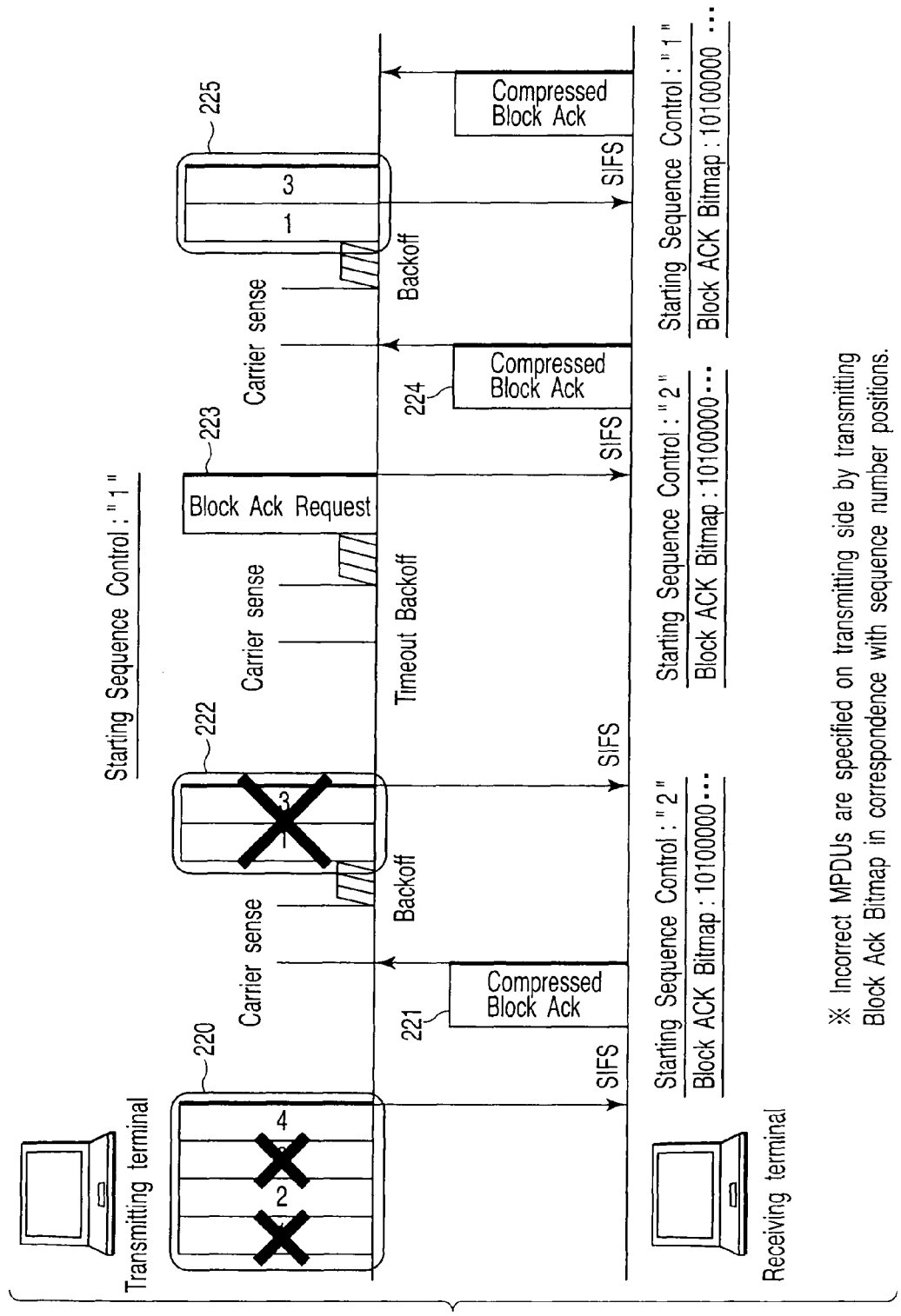
FIG. 24 is a view showing a retransmission sequence based on the Compressed Block Ack Bitmap created in correspondence with the sequence number positions.

FIG. 24 shows an example of how frames are exchanged when a Compressed Block Ack Bitmap is created in correspondence with sequence number positions. The data transmitting terminal transmits a physical frame 220 in which MPDUs with sequence numbers "1" to "4" are aggregated. The receiving side has successfully received the MPDUs with sequence numbers "2" and "4", and returns a Compressed Block Ack 221 upon setting the Block Ack Starting Sequence Control value to "2" and the Block Ack Bitmap to "10100000 . . . ". Since the MPDUs with sequence numbers "1" and "3" are incorrect, the data transmitting terminal transmits a physical frame 222 in which these MPDUs to be retransmitted are aggregated. The overall physical frame 222 is destroyed by collision or the like, and a Block Ack Request 223 with the Block Ack Starting Sequence Control value being set to "1" is transmitted. The receiving side returns a Compressed Block Ack 224 with the same contents as those of the previously returned Compressed Block Ack. The transmitting terminal regards the MPDU with sequence number "1" before the Block Ack Starting Sequence Control value "2" as one that the terminal has failed to transmit. Assume that the Block Ack Starting Sequence Control value is "2" and the Block Ack Bitmap is set to "10100000 . . . ". In this case, since this information is created on the basis of the sequence number positions, the bit information corresponding to sequence number "3" is 0, and it can be determined that the transmission has failed. Therefore, the MPDUs with sequence numbers "1" and "3" to be retransmitted are aggregated to transmit a physical frame 225.

As described above, a Compressed Block Ack Bitmap in a Compressed Block Ack can be created by roughly two types of methods. Information indicating which one of the methods was used to create a Compressed Block Ack Bitmap is recognized by the transmitting and receiving terminals through negotiation. Alternatively, the terminals may be made to recognize such information by using one bit of the reserved field of the Block Ack Control field shown in FIG. 21, as needed.

According to the embodiments of the present invention described above, the reception buffer in a receiving terminal can be managed upon successful reception of the first MPDU of the MPDUs aggregated in a PSDU. This prevents MPDUs from undesirably staying in the reception buffer and can improve the reception buffer efficiency, i.e., the MAC efficiency. If the remainder of an HCCA period is small, and retransmission processing cannot be performed because an EDCA period approaches, an HC transmits a Block Ack Request to clear the reception buffer. This makes it possible to prevent MPDUs from undesirably staying in the reception buffer and obtain the same effects as those described above. In addition, variably changing the length of a Compressed Block Ack Bitmap in accordance with the number of MAC frames to be aggregated makes it possible to solve the problem that when retransmission occurs, the transmitting terminal side erroneously decodes a Compressed Block Ack frame in the past.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus comprising:
   a physical frame transmitting device configured to transmit a physical frame to a destination communication apparatus in a first channel use permission period, the physical frame including a plurality of data frames; and
   an acknowledgement request frame transmitting device configured to transmit an acknowledgement request frame to the destination communication apparatus, at a start of a second channel use permission period, the second channel use permission period being acquired after the first channel use permission period, wherein a starting sequence number of the acknowledgement request frame is set larger than any sequence numbers of the transmitted data frames in the physical frame, in order that the destination communication apparatus forwards to an upper layer a data frame which has already been stored in a reception buffer of the destination communication apparatus.

2. An apparatus according to claim 1, wherein the acknowledgement request frame transmitting device determines, on the basis of intervals of transmission of physical frames by the physical frame transmitting device, whether or not to transmit the acknowledgement request frame.

3. An apparatus according to claim 1, wherein the acknowledgement request frame transmitting device transmits the acknowledgement request frame with a highest priority immediately after the start of a contention period following a contention free period.

4. A communication method comprising:
   transmitting, by a transmitting device, a physical frame to a destination communication apparatus in a first channel use permission period, the physical frame including a plurality of data frames; and
   transmitting, by the transmitting device, an acknowledgement request frame to the destination communication apparatus at a start of a second channel use permission period, the second channel use permission period being acquired after the first channel use permission period, wherein a starting sequence number of the acknowledgement request frame is set larger than any sequence numbers of the transmitted data frames in the physical frame, in order that the destination communication apparatus forwards to an upper layer, a data frame which has already been stored in a reception buffer of the destination communication apparatus.

5. The communication apparatus according to claim 1, further comprising a semiconductor integrated circuit including a CPU that executes a firmware.

6. The communication apparatus according to claim 5, wherein the CPU includes at least part of a MAC layer function.

7. The communication apparatus according to claim 1, further comprising an antenna, wherein the physical frame transmitting device transmits the physical frame to the destination communication apparatus via the antenna and the acknowledgement request frame transmitting device transmits the acknowledgement request frame to the destination communication apparatus via the antenna.

* * * * *